(12) United States Patent
Li et al.

(10) Patent No.: US 11,425,202 B2
(45) Date of Patent: Aug. 23, 2022

(54) SESSION PROCESSING METHOD AND DEVICE

(71) Applicant: Huawei International Pte. Ltd., Singapore (SG)

(72) Inventors: Lichun Li, Singapore (SG); Zhongding Lei, Singapore (SG); Bo Zhang, Shenzhen (CN)

(73) Assignee: Huawei International Pte. Ltd., Singapore (SG)

( * ) Notice: Subject to any disclaimer, the term of this patent is extended or adjusted under 35 U.S.C. 154(b) by 70 days.

(21) Appl. No.: 16/659,334

(22) Filed: Oct. 21, 2019

(65) Prior Publication Data

US 2020/0053165 A1 Feb. 13, 2020

Related U.S. Application Data

(63) Continuation of application No. PCT/SG2017/050367, filed on Jul. 20, 2017.

(51) Int. Cl.
*H04L 67/141* (2022.01)
*H04L 61/5007* (2022.01)
*H04W 84/04* (2009.01)

(52) U.S. Cl.
CPC ........ *H04L 67/141* (2013.01); *H04L 61/2007* (2013.01); *H04W 84/042* (2013.01)

(58) Field of Classification Search
CPC ...... H04L 67/141; H04W 12/06; H04W 12/08
See application file for complete search history.

(56) References Cited

U.S. PATENT DOCUMENTS 6,400,711 B1 6/2002 Pounds et al.
7,415,026 B2 8/2008 Hsu et al.
(Continued)

FOREIGN PATENT DOCUMENTS

CN 101202710 A 6/2008
CN 102883376 A 1/2013
(Continued)

OTHER PUBLICATIONS

3GPP TSG SA WG3 (Security) Meeting #86Bis, Mar. 27-31, 2017, Busan, Korea Source: Nokia, Ericsson, Qualcomm, S3-170745, Title: EAP based Secondary authentication with an external DN-AAA server (Year: 2017).*
(Continued)

*Primary Examiner* — Jeffrey M Rutkowski
*Assistant Examiner* — Chae S Lee
(74) *Attorney, Agent, or Firm* — Leydig, Voit & Mayer, Ltd.

(57) ABSTRACT

Embodiments of a session processing method and a device relating to a data network are provided. The method includes a data-network network element in the data network receiving a data network access request sent by a session management function (SMF) network element of the data network, where the data network access request includes an identifier of user equipment UE and a session address to be used by the UE. The data-network network element sends a response message to the SMF, where the response message instructs the SMF to allow the UE to access the data network, so that the SMF establishes a data packet unit session of the UE. The data-network network element detects, based on the session address or the identifier of the UE, that the data packet unit session of the UE needs to be processed, generates a session processing request, and
(Continued)

instructs, by using the session processing request, the SMF to process the data packet unit session of the UE.

20 Claims, 15 Drawing Sheets

(56) References Cited

U.S. PATENT DOCUMENTS

| | | | |
|---|---|---|---|
| 2009/0059818 | A1 | 3/2009 | Pickett |
| 2017/0171187 | A1* | 6/2017 | Yin .................. H04L 9/3242 |
| 2017/0238237 | A1* | 8/2017 | Chen .................. H04W 48/08 370/328 |
| 2017/0331691 | A1 | 11/2017 | Zhou |
| 2018/0227302 | A1* | 8/2018 | Lee .................. H04W 12/0431 |
| 2018/0227743 | A1* | 8/2018 | Faccin .................. H04W 76/10 |
| 2018/0317086 | A1* | 11/2018 | Ben Henda ....... H04W 12/0431 |
| 2018/0376446 | A1* | 12/2018 | Youn .................. H04W 76/30 |

FOREIGN PATENT DOCUMENTS

| | | |
|---|---|---|
| CN | 104348826 A | 2/2015 |
| CN | 106302638 A | 1/2017 |
| EP | 1560387 B2 | 12/2012 |
| JP | 2005244964 A | 9/2005 |

OTHER PUBLICATIONS

"3rd Generation Partnership Project; Technical Specification Group Services and System Aspects; System Architecture for the 5G System; Stage 2 (Release 15)," 3GPP TS 23.501 V0.3.0, pp. 1-98, 3rd Generation Partnership Project, Valbonne, France (Feb. 2017).

"3rd Generation Partnership Project; Technical Specification Group Services and System Aspects; Procedures for the 5G System; Stage 2(Release 15)," 3GPP TS 23.502 V0.5.0, pp. 1-148, 3rd Generation Partnership Project, Valbonne, France (Jul. 2017).

"TS 23.501: Completion of PDU session establishment authentication and alignment to SA3," SA WG2 Meeting #S2-121, Hangzhou, P. R. China, S2-173113, pp. 1-3, 3rd Generation Partnership Project, Valbonne, France (May 15-19, 2017).

"TS 23.501: Align PDU session establishment with AF influence on traffic routing and update to DN authorization of PDU session establishment," 3GPP TSG SA WG2 Meeting #122, San Jose Del Cabo, Mexico, S2-174435, pp. 1-6, 3rd Generation Partnership Project, Valbonne, France (Jun. 26-30, 2017).

"23.502: CN-initiated PDU Session Deactivation," SA WG2 Meeting #122, San Jose Del Cabo, Mexico, S2-174821, pp. 1-2, 3rd Generation Partnership Project, Valbonne, France (Jun. 26-30, 2017).

"TS 23.501: Completion of PDU session establishment authentication and alignment to SA3," SA WG2 Meeting #S2-122, San Jose Del Cabo, Mexico, S2-175042, pp. 1-4, 3rd Generation Partnership Project, Valbonne, France (Jun. 26-30, 2017).

"3rd Generation Partnership Project; Technical Specification Group Services and System Aspects; Security Architecture and Procedures for 5G System (Release 15)," 3GPP TS 33.501 V0.2.0, pp. 1-25, 3rd Generation Partnership Project, Valbonne, France (May 2017).

"Presentation of TR 23.501: System Architecture for the 5G System (Release 15) to TSG SA for Approval," 3GPP TSG SA Meeting #76, West Palm Beach, Florida, USA, SP-170384, pp. 1-2, 3rd Generation Partnership Project, Valbonne, France (Jun. 7-9, 2017).

"3rd Generation Partnership Project; Technical Specification Group Services and System Aspects; System Architecture for the 5G System; Stage 2(Release 15)," 3GPP TS 23.501 V1.0.0, pp. 1-146, 3rd Generation Partnership Project, Valbonne, France (Jun. 2017).

"3rd Generation Partnership Project; Technical Specification Group Services and System Aspects; Procedures for the 5G System; Stage 2 (Release 15)," 3GPP TS 23.502 V0.2.0, pp. 1-71, 3rd Generation Partnership Project, Valbonne, France (Feb. 2017).

"3rd Generation Partnership Project; Technical Specification Group Services and System Aspects; Procedures for the 5G System; Stage 2 (Release 15)," 3GPP TS 23.502 V0.3.0, pp. 1-115, 3rd Generation Partnership Project, Valbonne, France (Mar. 2017).

Nokia, Ericsson, Qualcomm, "EAP based Secondary authentication with an external DN-AAA server," 3GPP TSG SA WG3 (Security) Meeting #86Bis, Busan, Korea, S3-170745 (revision of S3-17abcd) total 3 pages, 3rd Generation Partnership Project, Valbonne, France (Mar. 27-31, 2017).

CN/201780082837.7, Office Action/Search Report, dated May 27, 2021.

* cited by examiner

SESSION PROCESSING METHOD AND DEVICE

CROSS-REFERENCE TO RELATED APPLICATIONS

This application is a continuation of International Application No. PCT/SG2017/050367, filed on Jul. 20, 2017. The disclosure of the aforementioned application is hereby incorporated by reference in its entirety.

TECHNICAL FIELD

This application relates to the communications field, and in particular, to a session processing method and a device.

BACKGROUND

When user equipment (UE) accesses a 5G network, a 3rd generation partnership project (3GPP) network first needs to perform primary authentication on the UE. The UE can access the 3GPP network only after the primary authentication performed on the UE succeeds, and further, the UE requests the 3GPP network to establish a packet data unit (PDU) session with a data network (DN), to access the DN. In addition, when the UE accesses the DN, the DN may need to perform secondary authentication and/or authorization on the UE. The UE is allowed to establish the PDU session only after the authentication and/or authorization succeed/succeeds.

The prior art already supports a DN in performing authentication and authorization on UE, but does not support the DN in modifying and canceling authorization on the UE, to be specific, does not support the DN in triggering deletion and modification of a PDU session. In this way, even if the DN detects that particular UE (to be specific, the 3GPP network has established a PDU session for the UE) that has accessed the DN is malicious or unauthorized UE, the DN still cannot terminate the access of the UE to the DN. For another example, after subscription of the UE to the DN is canceled or modified (or a trust level of the UE changes), the DN cannot correspondingly trigger revocation and modification of permission of the UE on the PDU session. It can be learned that absence of the function of the DN leads to security risks and misuse of network resources, and effective access control cannot be achieved.

SUMMARY

Embodiments of the present invention provide a session control method and a device, so that a DN can control, based on a detected abnormal status, deletion and modification of a PDU session, thereby achieving effective access control.

To achieve the foregoing objective, the following technical solutions are used in the embodiments of the present invention:

According to a first aspect, a session processing method is disclosed. The session processing method includes the following:

A session management function network element SMF receives a session establishment request from UE, and then determines a session address to be used by a session of the UE. Further, the SMF sends a data network access request to a data-network network element in a DN, where the request includes the session address and an identifier of the UE, and may instruct the data-network network element to perform authentication and/or authorization on the UE. After the data-network network element performs the authentication and/or authorization on the UE, the SMF may receive a response message sent by the data-network network element, where the message instructs to allow the UE to access the data network. In other words, the UE is successfully authenticated and/or successfully authorized. Then, the SMF may establish the session of the UE.

According to the session processing method provided in this embodiment of the present invention, the SMF predetermines the session address of the UE, and when the DN performs authentication or authorization on the UE, the SMF provides the session address and the identifier of the UE for the data-network network element, and subsequently establishes the session for the UE based on the session address. In this way, when the data-network network element detects that the session of the UE needs to be processed (for example, traffic of the session changes), the data-network network element may be associated with the session of the UE based on the received session address or the identifier of the user, and send a request to the SMF or a PCF to trigger processing of the session.

With reference to the first aspect, in a first possible implementation of the first aspect, after the establishing, by the SMF, the session of the UE, the method further includes: receiving, by the SMF, a session processing request triggered by the data-network network element, and processing the session of the UE according to the session processing request.

In the prior art, the DN cannot trigger processing of a session. However, in this embodiment of the present invention, the data network of the DN may trigger, in the foregoing manners, processing of the session, to achieve effective access control.

With reference to the first aspect and the first possible implementation of the first aspect, in a second possible implementation of the first aspect, the determining a session address to be used by a session of the UE includes: If a type of a session to be established for the UE is an Ethernet type, the UE adds an Ethernet address of the UE to the session establishment request. In this case, if the SMF parses the session establishment request, the SMF may obtain the Ethernet address of the UE in the session establishment request, and use the Ethernet address as the session address. Certainly, the SMF may alternatively allocate a session address to the UE, and when a type of a session to be established for the UE is an IP type, the SMF allocates an IP address to the UE as the session address; or the SMF allocates an IP prefix to the UE as the session address. When a type of a session to be established for the UE is an unstructured type, the SMF allocates a tunnel IP address to a user plane function network element UPF as the session address; or the SMF allocates a tunnel IP prefix to a UPF as the session address.

In this way, the SMF may determine the session address to be used by the UE, so that the data-network network element can monitor the session after the session address is sent to the data-network network element.

With reference to any one of the first aspect or the possible implementations of the first aspect, in a third possible implementation of the first aspect, the data network access request is an authentication request, the response message is an authentication response message, and the authentication response message carries an authentication success identifier.

In other words, before establishing the session for the UE, the SMF may perform authentication on the UE, and establish the session for the UE only when a result of the authentication on the UE is that the authentication succeeds. In this way, validity of the UE can be ensured, and a session is prevented from being established for unauthorized UE, thereby improving network communication security.

With reference to any one of the first aspect or the possible implementations of the first aspect, in a fourth possible implementation of the first aspect, the data network access request is an authentication request, the response message is an authentication response message, the authentication request carries an authorization request identifier, and the authentication response message carries an authentication success identifier and an authorization success identifier.

In other words, before establishing the session for the UE, the SMF may perform authentication and authorization on the UE, and establish the session for the UE only when the authentication and the authorization on the UE succeed. In this way, validity of the UE can be ensured, and a session is prevented from being established for unauthorized UE, thereby improving network communication security.

With reference to any one of the first aspect or the possible implementations of the first aspect, in a fifth possible implementation of the first aspect, the data network access request is an authorization request, the response message is an authorization response message, and the authorization response message carries an authorization success identifier.

In other words, before establishing the session for the UE, the SMF may perform authorization on the UE, and establish the session for the UE only when the authorization on the UE succeeds. In this way, validity of the UE can be ensured, and a session is prevented from being established for unauthorized UE, thereby improving network communication security.

With reference to any one of the first aspect or the possible implementations of the first aspect, in a sixth possible implementation of the first aspect, the receiving, by the SMF, a session processing request triggered by the data-network network element includes: receiving a first session processing request sent by the data-network network element; or receiving a third session processing request sent by a policy control function network element, where the third session processing request is sent to the SMF after the policy control function network element receives a second session processing request sent by the data-network network element.

In other words, the data-network network element may trigger, in two manners, the SMF to process the session of the UE. The data-network network element may directly instruct the SMF to process the session of the UE. Alternatively, the data-network network element may notify a policy control function network element PCF, and the PCF instructs the SMF to process the session of the UE.

With reference to any one of the first aspect or the possible implementations of the first aspect, in a sixth possible implementation of the first aspect, the processing the session of the UE according to the session processing request includes: deleting the session of the UE or modifying the session of the UE.

The deleting the session of the UE is releasing the session established for the UE, and deleting a resource of the session. The modifying the session of the UE may be modifying permission on the session, for example, adding a network element, where the UE is allowed to access the network element by using the session.

According to a second aspect, a session processing method is disclosed. The session processing method includes the following:

A data-network network element receives a data network access request sent by an SMF, where the request includes an identifier of UE and a session address to be used by the UE. Further, the data-network network element may perform authentication and/or authorization on the UE. Subsequently, the data-network network element sends a response message to the SMF. After learning, based on the response message, that the UE is allowed to access a data network, the SMF establishes a session of the UE. When detecting, based on the session address or the identifier of the UE, that the session of the UE needs to be processed, the data-network network element generates a session processing request, and instructs, by using the session processing request, the SMF to process the session of the UE.

According to the session processing method provided in this embodiment of the present invention, the SMF predetermines the session address of the UE, and when the DN performs authentication or authorization on the UE, the SMF provides the session address and the identifier of the UE for the data-network network element, and subsequently establishes the session for the UE based on the session address. In this way, when the data-network network element detects that the session of the UE needs to be processed (for example, traffic of the session changes), the data-network network element may be associated with the session of the UE based on the received session address or the identifier of the user, and send a request to the SMF or a PCF to trigger processing of the session.

With reference to the second aspect, in a first possible implementation of the second aspect, the data network access request is an authentication request, the response message is an authentication response message, and the authentication response message carries an authentication success identifier.

In other words, before establishing the session for the UE, the SMF may perform authentication on the UE, and establish the session for the UE only when a result of the authentication on the UE is that the authentication succeeds. In this way, validity of the UE can be ensured, and a session is prevented from being established for unauthorized UE, thereby improving network communication security.

With reference to the second aspect or the possible implementation of the second aspect, in a second possible implementation of the second aspect, the data network access request is an authentication request, the response message is an authentication response message, the authentication request carries an authorization request identifier, and the authentication response message carries an authentication success identifier and an authorization success identifier.

In other words, before establishing the session for the UE, the SMF may perform authentication and authorization on the UE, and establish the session for the UE only when the authentication and the authorization on the UE succeed. In this way, validity of the UE can be ensured, and a session is prevented from being established for unauthorized UE, thereby improving network communication security.

With reference to any one of the second aspect or the possible implementations of the second aspect, in a third possible implementation of the second aspect, the data network access request is an authorization request, the response message is an authorization response message, and the authorization response message carries an authorization success identifier.

In other words, before establishing the session for the UE, the SMF may perform authorization on the UE, and establish the session for the UE only when the authorization on the UE succeeds. In this way, validity of the UE can be ensured, and a session is prevented from being established for unauthorized UE, thereby improving network communication security.

With reference to any one of the second aspect or the possible implementations of the second aspect, in a fourth possible implementation of the second aspect, the detecting, by the data-network network element based on the session address or the identifier of the UE, that the session of the UE needs to be processed includes: if detecting that the UE is in an abnormal access state, determining that a session corresponding to the identifier of the UE needs to be processed, where the abnormal access state includes at least one of the following cases: the UE is unauthorized UE, a subscription status of the UE changes, and a trust level of the UE changes; or if detecting that traffic corresponding to the session address changes, determining that a session corresponding to the session address needs to be processed.

In this way, the data-network network element may be associated with a session based on the received session address or identifier, and then may trigger processing of the session.

With reference to any one of the second aspect or the possible implementations of the second aspect, in a fifth possible implementation of the second aspect, before the detecting, by the data-network network element, that the session of the UE needs to be processed, the method further includes: receiving, by using the session of the UE, an authentication request sent by the UE, and performing authentication on the UE.

In other words, after the session is established for the UE, the authentication may be further performed on the UE, to ensure validity of the UE.

With reference to any one of the second aspect or the possible implementations of the second aspect, in a sixth possible implementation of the second aspect, the detecting, by the data-network network element based on the identifier of the UE, that the session of the UE needs to be processed includes: if an authentication result of the authentication performed on the UE is that the authentication succeeds, determining that a session corresponding to the identifier of the UE needs to be modified, so that a maximum transmission rate during data transmission performed by the UE by using the session of the UE is improved and/or the UE can access a network element other than the data-network network element by using the session of the UE.

In other words, the data-network network element may determine, based on the authentication result, specific processing to be performed on the session of the UE. Before this, permission on the session established for the UE is only allowing the UE to access the data-network network element. When the authentication on the UE succeeds, the UE needs to access another network element by using the session. Therefore, the permission on the session needs to be expanded. Certainly, alternatively, a threshold of a transmission rate of the session may be improved.

With reference to any one of the second aspect or the possible implementations of the second aspect, in a seventh possible implementation of the second aspect, the detecting, by the data-network network element based on the identifier of the UE, that the session of the UE needs to be processed includes: if an authentication result of the authentication performed on the UE is that the authentication fails, determining that a session corresponding to the identifier of the UE needs to be deleted.

In other words, the data-network network element may determine, based on the authentication result, specific processing to be performed on the session of the UE. When the authentication on the UE fails, it indicates that the UE may be unauthorized UE. In this case, to avoid a waste of network resources, the session established for the UE may be released.

With reference to any one of the second aspect or the possible implementations of the second aspect, in an eighth possible implementation of the second aspect, the detecting, by the data-network network element based on the identifier of the UE, that the session of the UE needs to be processed includes: starting, by the data-network network element, a timer after the data network access request is received, and if the data-network network element does not receive, within a first time window determined by the timer, a data packet sent by the UE by using the session of the UE, determining that a session corresponding to the identifier of the UE needs to be deleted; or starting, by the data-network network element, a timer after the response message is sent to the SMF, and if the data-network network element does not receive, within a second time window determined by the timer, a data packet sent by the UE by using the session of the UE, determining that a session corresponding to the identifier of the UE needs to be deleted.

Although the session has been established for the UE, the UE does not use the session to transmit a PDU. In this case, the session established for the UE may be released. Specifically, the timer is started in advance, and if no PDU transmitted by the UE by using the session is received when the timer times out, it is considered that the UE does not transmit any PDU by using the session.

With reference to any one of the second aspect or the possible implementations of the second aspect, in a ninth possible implementation of the second aspect, the generating, by the data-network network element, a session processing request, and instructing, by using the session processing request, the SMF to process the session of the UE includes: sending a first session processing request to the SMF to instruct the SMF to process the session of the UE.

In some embodiments, the data network may directly instruct the SMF to process the session of the UE.

With reference to any one of the second aspect or the possible implementations of the second aspect, in a tenth possible implementation of the second aspect, the generating, by the data-network network element, a session processing request, and instructing, by using the session processing request, the SMF to process the session of the UE includes: sending a second session processing request to a policy control function network element PCF to instruct the PCF to send the second session processing request to the SMF to trigger the SMF to process the session of the UE.

In some embodiments, the data-network network element may alternatively notify the policy control function network element PCF, and the PCF instructs the SMF to process the session of the UE.

With reference to any one of the second aspect or the possible implementations of the second aspect, in an eleventh possible implementation of the second aspect, the second session processing request carries the session address.

When the data network directly instructs the SMF to process the session of the UE, the data network may add the session address to the second session request, and inform the SMF of an address of the session to be processed, so that the SMF processes the session of the UE.

With reference to any one of the second aspect or the possible implementations of the second aspect, in a twelfth possible implementation of the second aspect, before the sending, by the data-network network element, a second session processing request to a PCF, the method further includes: sending, by the data-network network element, the session address to the PCF.

In some embodiments, alternatively, the data-network network element may inform, before sending the second session processing request, the SMF of an address of the session to be processed, so that the SMF processes the session of the UE.

According to a third aspect, a session management function network element SMF is disclosed. The SMF includes: a receiving unit, configured to receive a session establishment request from UE user equipment; a determining unit, configured to determine a session address to be used by a session of the UE; a sending unit, configured to send a data network access request to a data-network network element, where the data network access request includes the session address and an identifier of the UE, where the receiving unit is further configured to receive a response message sent by the data-network network element, where the response message instructs to allow the UE to access a data network; and an establishment unit, configured to establish the session of the UE.

With reference to the third aspect, in a first possible implementation of the third aspect, the SMF further includes a processing unit. The receiving unit is further configured to: after the establishment unit establishes the session of the UE, receive a session processing request triggered by the data-network network element. The processing unit is configured to process the session of the UE according to the session processing request.

With reference to the third aspect or the possible implementation of the third aspect, in a second possible implementation of the third aspect, the determining unit is configured to: parse the session establishment request, to obtain an Ethernet address of the UE in the session establishment request as the session address; or allocate an IP address to the UE as the session address; or allocate an IP prefix to the UE as the session address; or allocate a tunnel IP address to a user plane function network element UPF as the session address; or allocate a tunnel IP prefix to a UPF as the session address.

With reference to any one of the third aspect or the possible implementations of the third aspect, in a second possible implementation of the third aspect, the data network access request is an authentication request, the response message is an authentication response message, and the authentication response message carries an authentication success identifier.

With reference to any one of the third aspect or the possible implementations of the third aspect, in a third possible implementation of the third aspect, the data network access request is an authentication request, the response message is an authentication response message, the authentication request carries an authorization request identifier, and the authentication response message carries an authentication success identifier and an authorization success identifier.

With reference to any one of the third aspect or the possible implementations of the third aspect, in a fourth possible implementation of the third aspect, the data network access request is an authorization request, the response message is an authorization response message, and the authorization response message carries an authorization success identifier.

With reference to any one of the third aspect or the possible implementations of the third aspect, in a fifth possible implementation of the third aspect, the receiving unit is configured to: receive a first session processing request sent by the data-network network element; or receive a third session processing request sent by a policy control function network element, where the third session processing request is sent to the SMF after the policy control function network element receives a second session processing request sent by the data-network network element.

With reference to any one of the third aspect or the possible implementations of the third aspect, in a sixth possible implementation of the third aspect, the processing unit is configured to delete the session of the UE or modify the session of the UE.

According to a fourth aspect, a data-network network element is disclosed. The data-network network element includes: a receiving unit, configured to receive a data network access request sent by a session management function network element SMF, where the data network access request includes an identifier of user equipment UE and a session address to be used by the UE; a sending unit, configured to send a response message to the SMF, where the response message instructs to allow the UE to access a data network, so that the SMF establishes a session of the UE; a detection unit, configured to detect, based on the session address or the identifier of the UE, that the session of the UE needs to be processed; and a generation unit, configured to generate a session processing request when the detection unit detects that the session of the UE needs to be processed, where the sending unit is further configured to instruct, by using the session processing request generated by the generation unit, the SMF to process the session of the UE.

With reference to the fourth aspect, in a first possible implementation of the fourth aspect, the data network access request is an authentication request, the response message is an authentication response message, and the authentication response message carries an authentication success identifier.

With reference to the fourth aspect or the possible implementation of the fourth aspect, in a second possible implementation of the fourth aspect, the data network access request is an authentication request, the response message is an authentication response message, the authentication request carries an authorization request identifier, and the authentication response message carries an authentication success identifier and an authorization success identifier.

With reference to any one of the fourth aspect or the possible implementations of the fourth aspect, in a third possible implementation of the fourth aspect, the data network access request is an authorization request, the response message is an authorization response message, and the authorization response message carries an authorization success identifier.

With reference to any one of the fourth aspect or the possible implementations of the fourth aspect, in a fourth possible implementation of the fourth aspect, the detection unit is configured to: if detecting that the UE is in an abnormal access state, determine that a session corresponding to the identifier of the UE needs to be processed, where the abnormal access state includes at least one of the following cases: the UE is unauthorized UE, a subscription status of the UE changes, and a trust level of the UE changes; or if detecting that traffic corresponding to the session address changes, determine that a session corresponding to the session address needs to be processed.

With reference to any one of the fourth aspect or the possible implementations of the fourth aspect, in a fifth possible implementation of the fourth aspect, the receiving unit is further configured to: before the detection unit detects that the session of the UE needs to be processed, receive, by using the session of the UE, an authentication request sent by the UE, and perform authentication on the UE.

With reference to any one of the fourth aspect or the possible implementations of the fourth aspect, in a sixth possible implementation of the fourth aspect, the detection unit is configured to: if an authentication result of the authentication performed on the UE is that the authentication succeeds, determine that a session corresponding to the identifier of the UE needs to be modified, so that a maximum transmission rate during data transmission performed by the UE by using the session of the UE is improved and/or the UE can access a network element other than the data-network network element by using the session of the UE.

With reference to any one of the fourth aspect or the possible implementations of the fourth aspect, in a seventh possible implementation of the fourth aspect, the detection unit is configured to: if an authentication result of the authentication performed on the UE is that the authentication fails, determine that a session corresponding to the identifier of the UE needs to be deleted.

With reference to any one of the fourth aspect or the possible implementations of the fourth aspect, in an eighth possible implementation of the fourth aspect, the detection unit is configured to: if the receiving unit does not receive, within a first time window after the data network access request is received, a data packet sent by the UE by using the session of the UE, determine that a session corresponding to the identifier of the UE needs to be deleted; or if the receiving unit does not receive, within a second time window after the response message is sent to the SMF, a data packet sent by the UE by using the session of the UE, determine that a session corresponding to the identifier of the UE needs to be deleted.

With reference to any one of the fourth aspect or the possible implementations of the fourth aspect, in a ninth possible implementation of the fourth aspect, the sending unit is configured to send a first session processing request to the SMF to instruct the SMF to process the session of the UE.

With reference to any one of the fourth aspect or the possible implementations of the fourth aspect, in a tenth possible implementation of the fourth aspect, the sending unit is configured to send a second session processing request to a policy control function network element PCF to instruct the PCF to send the second session processing request to the SMF to trigger the SMF to process the session of the UE.

With reference to any one of the fourth aspect or the possible implementations of the fourth aspect, in an eleventh possible implementation of the fourth aspect, the second session processing request carries the session address.

With reference to any one of the fourth aspect or the possible implementations of the fourth aspect, in a thirteenth possible implementation of the fourth aspect, the sending unit is further configured to send the session address to a PCF before sending a second session processing request to the PCF.

According to a fifth aspect of the embodiments of this application, an SMF is provided. The SMF may include at least one processor, a memory, a communications interface, and a communications bus.

The at least one processor, the memory, and the communications interface are connected by using the communications bus. The memory is configured to store a computer-executable instruction. When a server operates, the processor executes the computer-executable instruction stored in the memory, so that a base station performs the session processing method according to any one of the first aspect or the possible implementations of the first aspect.

According to a sixth aspect of the embodiments of this application, a data-network network element is provided. The data-network network element may include at least one processor, a memory, and a transceiver.

The at least one processor, the memory, and a communications interface are connected by using a communications bus. The memory is configured to store a computer-executable instruction. When a server operates, the processor executes the computer-executable instruction stored in the memory, so that UE performs a discovery signal transmission method according to any one of the second aspect or the possible implementations of the second aspect.

According to a seventh aspect of the embodiments of this application, a computer storage medium is disclosed. The computer storage medium is configured to store a computer software instruction used by the foregoing SMF, where the computer software instruction includes a program for performing the foregoing session processing method.

According to an eighth aspect of the embodiments of this application, another computer storage medium is disclosed. The computer storage medium is configured to store a computer software instruction used by the foregoing data-network network element, where the computer software instruction includes a program for performing the foregoing session processing method.

DESCRIPTION OF EMBODIMENTS

The following describes the technical solutions in the embodiments of the present invention in detail with reference to the accompanying drawings in the embodiments of the present invention.

Figure 1:
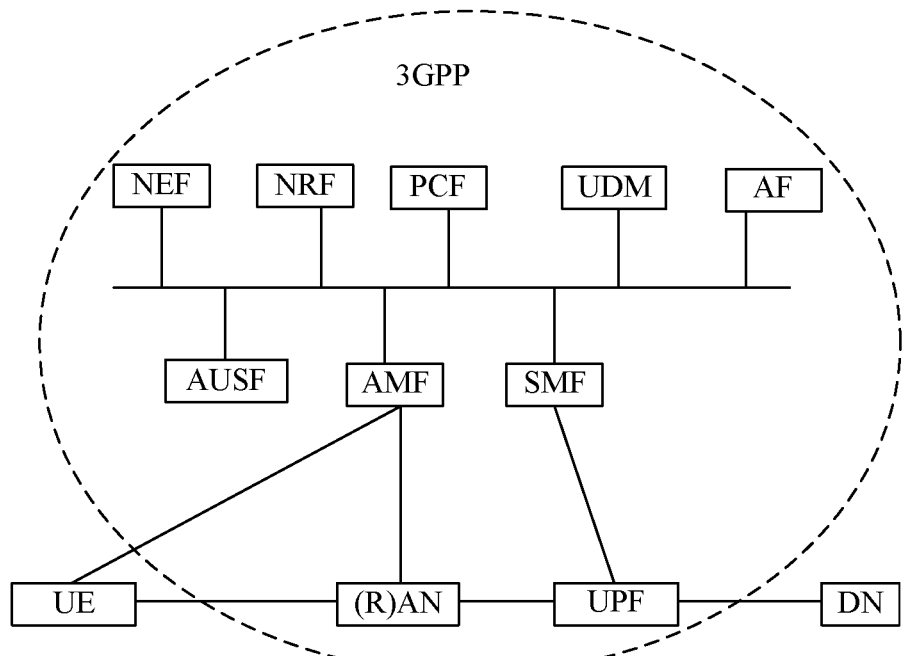
FIG. 1 is a schematic diagram of an existing 5G system architecture.

FIG. 1 is a schematic diagram of a 5G system architecture formulated by the 3GPP standard organization. Network elements other than UE and a DN form a 3GPP network. The 3GPP network is a network that conforms to a 3GPP standard and that is operated by an operator. The 3GPP network is not limited to a 5G network defined in the 3GPP, and may further include 2G, 3G, and 4G networks, and even a 6G network that may be defined in the future in the 3GPP. The following describes in detail network elements in the embodiments of this application in the architecture shown in FIG. 1.

An access and mobility management function network element (AMF) is a control plane network element provided by the operator, and may perform access control when UE accesses an operator network, or perform mobility management on UE.

A session management function network element (SMF) is also a control plane network element provided by the operator, and is responsible for establishing and managing a PDU session of the UE.

A data network (DN), also referred to as a PDN (packet data network), is a network located outside the 3GPP network. There may be a plurality of DNs in the 5G system architecture. A service provided by the operator or a third party may be deployed on the DN. For example, the DN may be an internal office network of a company, and a terminal (namely, UE) of a staff member of the company can access the DN by accessing the 3GPP network, to view internal resources of the company. The UE accesses the DN by accessing an operator network, and uses the service provided by the operator or the third party on the DN.

A unified data management network element (UDM) is a control plane network element provided by the operator, and is responsible for storing data of a 3GPP network subscriber, for example, a subscriber permanent ID (Subscriber Permanent Identifier, SUPI), a credential, or subscription data.

An authentication server function network element (authentication server function, AUSF) is a control plane network element provided by the operator. The 3GPP network performs authentication on the 3GPP network subscriber by using the AUSF, and the authentication may be referred to as primary authentication on the UE. Specifically, when the UE accesses the 3GPP network of the operator, the AUSF may perform primary authentication on the UE by using user data stored in the UDM.

A network exposure function network element (NEF) is a control plane network element provided by the operator. The NEF exposes an external interface of the 3GPP network to the third party securely. For example, when a network element such as the SMF needs to communicate with a third-party network element, the NEF may be used as a communication relay, and during the communication, the NEF may translate internal and external identifiers. For example, when an internal ID of the UE in the 3GPP network is sent from the 3GPP network to the third party, the NEF may translate the internal ID of the UE into a corresponding external ID of the UE. On the contrary, the NEF may translate an external ID into an internal ID of the UE when sending the external ID to the 3GPP network.

A user plane function network element (UPF) is a user plane network element provided by the operator, and is a gateway for communication between the 3GPP network and the DN.

A policy control function network element (PCF) is a control plane network element provided by the operator, and is configured to provide a PDU session policy for the SMF. The policy may include a charging-related policy, a quality of service (QoS)-related policy, an authorization-related policy, or the like.

In addition, for ease of understanding of the method provided in this application, terms used in this application are described.

1. A data packet (PDU) is a unit for data transmission between the UE and the DN. The PDU may be classified into an IP type of PDU, an Ethernet type of PDU, an unstructured type of PDU, or the like. Further, the IP type of PDU may be classified into an IPv4 type of PDU and an IPv6 type of PDU.

The IP type of PDU may be referred to as an IPPDU for short, and the Ethernet type of PDU may be referred to as an Ethernet PDU for short, or may be referred to as an Ethernet frame. It should be noted that the 3GPP network does not perceive the unstructured type of PDU, and the UE and the DN may communicate with each other by using an unstructured PDU in any customized format.

2. A PDU session is a channel for transmitting a PDU between the UE and the DN, the UE and the DN communicate by sending PDUs to each other by using a PDU session, and a path of the PDU session is UE-(R)AN-UPF-DN. In other words, the 3GPP network can provide a communication service for the UE and the DN by using a PDU session.

The SMF is responsible for establishing and managing the PDU session. In addition, in terms of a type of a transmitted PDU, the PDU session can also be classified into an IP type, an Ethernet type, and an unstructured type. Similarly, the IP type of PDU session may be classified into an IPv4 type of PDU session and an IPv6 type of PDU session.

As described above, when the UE accesses the DN by using the 3GPP network, the 3GPP network first needs to perform primary authentication on the UE. The primary authentication is performed on the SUPI provided by the UE, to verify whether the SUPI of the UE is valid or real. UE can access the 3GPP network only after primary authentication performed on the UE succeeds, and further, the UE requests to establish a PDU session, to access the DN. When the UE accesses the DN, the DN may need to perform further authentication (which may be referred to as secondary authentication) and/or authorization on the UE. UE is allowed to establish a PDU session only after the authentication and/or authorization succeed/succeeds. An ID (which may be referred to as a secondary ID) of the UE verified by the secondary authentication is usually different from an SUPI and a device ID verified by the primary authentication.

Further, a format of the SUPI may be an IMSI, and the device ID may be an IMEI. The 3GPP network may perform primary authentication on the UE by using the IMEI of the UE, and the DN may perform secondary authentication on the UE by using the IMEI of the UE. In addition, the secondary ID may be another identifier of a terminal. For example, the DN is an internal office network of a company, a terminal (namely, UE) of a staff member of the company may access the DN by accessing the 3GPP network, and the secondary ID may be an employee ID of the staff member inside the company.

When the secondary authentication and/or authorization performed by the DN on the UE need/needs to succeed, the 3GPP network establishes a PDU session for the UE. In some scenarios, the PDU session of the UE further needs to be processed based on a latest subscription status or traffic status of the UE. For example, when subscription of the UE is modified or canceled, a trust level or credibility of the UE changes, or traffic of the PDU session of the UE is abnormal, the PDU session needs to be processed, and such processing includes deleting the PDU session or modifying the PDU session (or permission on the session may be expanded or shrunk). In the prior art, in the foregoing scenario, the PCF usually triggers the SMF to process the PDU session. It can be learned that in the prior art, the DN cannot trigger processing of the PDU session, for example, deleting the PDU session and modifying the PDU session.

It can be learned that, the prior art already supports the DN in performing authentication and authorization on the UE, but does not support the DN in triggering processing (for example, deletion and modification) of the PDU session. For example, the DN detects that particular UE (to be specific, the 3GPP network has established a PDU session for the UE) that has accessed the DN is malicious or unauthorized UE, but the DN still cannot terminate the access of the UE to the DN. For another example, after subscription of the UE to the DN is canceled or modified, or a trust level of the UE changes, the DN cannot correspondingly trigger revocation and modification of permission of the UE on the PDU session, and cannot achieve effective access control. In conclusion, absence of the function of the DN of triggering processing of the PDU session leads to security risks and misuse of network resources, and effective access control cannot be achieved.

A principle of this application is as follows: When the DN performs authentication on the UE or performs authorization on the PDU session of the UE, the SMF provides a session address to be used by the UE and an identifier of the UE for a data-network network element (a network element in the DN for authentication and authorization, for example, an AAA), and subsequently, establishes a PDU session for the UE based on the session address. The data-network network element may be associated with a PDU session based on the received session address or the identifier of the UE, and monitor the PDU session. When detecting that the PDU session needs to be processed (for example, traffic of the PDU session changes), the data-network network element triggers processing of the PDU session, and sends a PDU session release or modification request to the SMF or the PCF.

Figure 2:
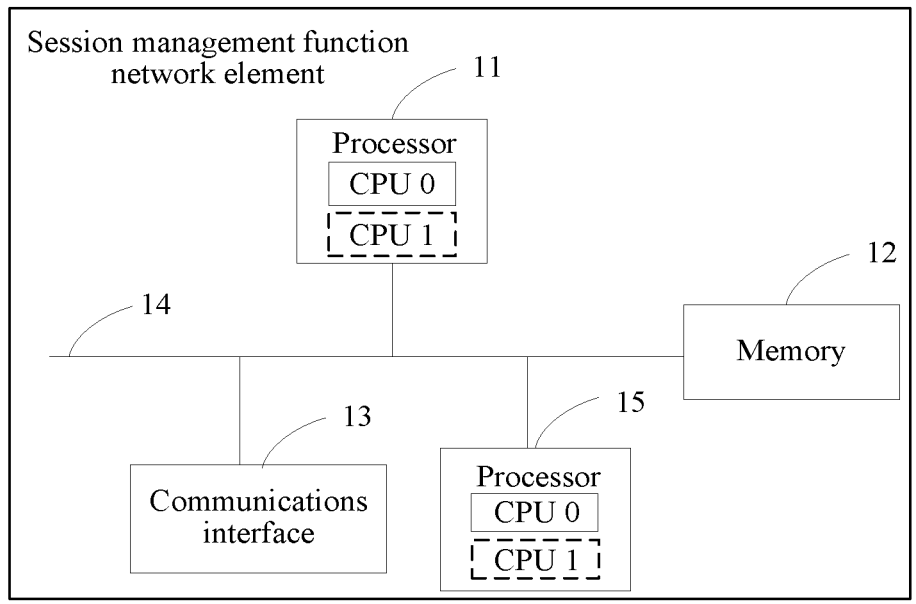
FIG. 2 is a schematic composition diagram of a session function management network element according to an embodiment of the present invention.

In specific implementation, FIG. 2 is a schematic composition diagram of a session function management network element SMF according to an embodiment of the present invention. The session function management network element may be the SMF in the system architecture shown in FIG. 1. As shown in FIG. 2, the session function management network element may include at least one processor 11, a memory 12, and a communications interface 13.

The following describes the components of the session function management network element with reference to FIG. 2.

The processor 11 is a control center of the session function management network element, and may be one processor or a general term of a plurality of processing elements. For example, the processor 11 is a central processing unit (CPU), or may be an application-specific integrated circuit (ASIC), or may be configured as one or more integrated circuits implementing this embodiment of the present invention, for example, one or more microprocessors (digital signal processor, DSP), or one or more field programmable gate arrays (FPGA).

The processor 11 may perform various functions of the session function management network element by running or executing a software program stored in the memory 12 and by invoking data stored in the memory 12.

In specific implementation, in an embodiment, the processor 11 may include one or more CPUs, for example, a CPU 0 and a CPU 1 shown in FIG. 2.

In specific implementation, in an embodiment, the session function management network element may include a plurality of processors, for example, the processor 11 and a processor 15 shown in FIG. 2. Each of these processors may be a single-core (single-CPU) processor, or may be a multi-core (multi-CPU) processor. The processors herein may refer to one or more session function management network elements, circuits, and/or processing cores configured to process data (for example, a computer program instruction).

The memory 12 may be a read-only memory (read-only memory, ROM), another type of static storage session function management network element that can store static information and an instruction, a random access memory (random access memory, RAM), or another type of dynamic storage session function management network element that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium or another magnetic storage session function management network element, or any other medium that can be configured to carry or store expected program code in an instruction form or a data structure form and that can be accessed by a computer, but the present invention is not limited thereto. The memory 12 may exist independently and be connected to the processor 11 by using the communications bus 14. Alternatively, the memory 12 may be integrated with the processor 11.

The memory 12 is configured to store a software program for performing a solution of the present invention, and the processor 11 controls the performing.

The communications interface 13 may include a sending interface for sending data and a receiving interface for receiving data from an external session function management network element. In other words, the session function management network element may respectively implement data receiving and data sending through two different communications interfaces. Certainly, for the communications interface 13, a data receiving function and a data sending function may be integrated into one communications interface, and the communications interface has the data receiving function and the data sending function.

A structure of the session function management network element shown in FIG. 2 does not constitute any limitation on the session function management network element, and more or fewer components than those shown in the figure may be included, or some components may be combined, or a different component deployment may be used.

Figure 3:
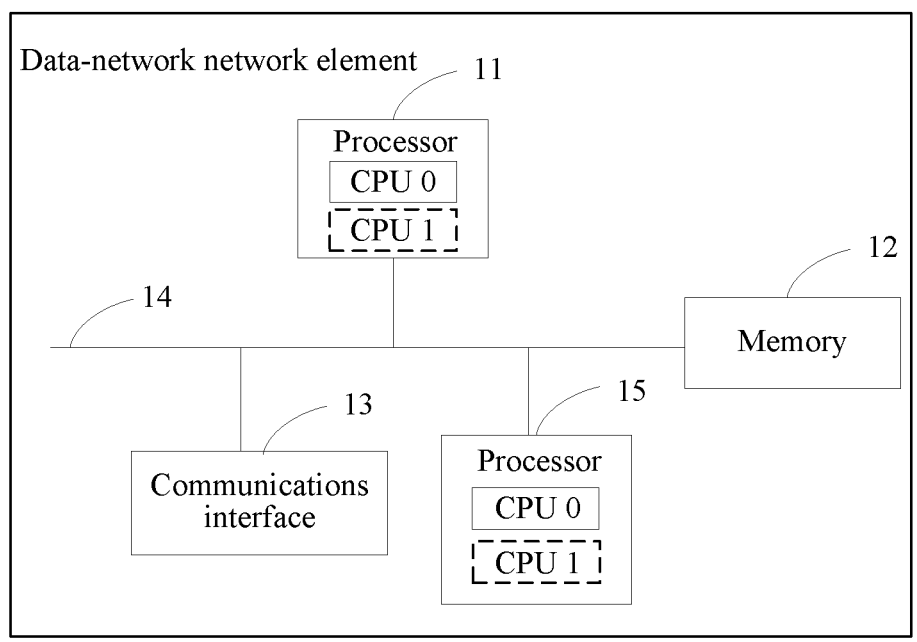
FIG. 3 is a schematic composition diagram of a data-network network element according to an embodiment of the present invention.

In specific implementation, FIG. 3 is a schematic composition diagram of a data-network network element according to an embodiment of the present invention. The data-network network element may be a network element that is configured to perform authentication and authorization on UE in the DN in the system architecture shown in FIG. 1, for example, an AAA (authentication authorization accounting) server, or an AAA proxy server. As shown in FIG. 3, the data-network network element may include at least one processor 21, a memory 22, and a communications interface 23.

The following describes the components of the data-network network element with reference to FIG. 3.

The processor 21 is a control center of the data-network network element, and may be one processor or a general term of a plurality of processing elements. For example, the processor 21 is a central processing unit (central processing unit, CPU), or may be an application-specific integrated circuit (Application Specific Integrated Circuit, ASIC), or may be configured as one or more integrated circuits implementing this embodiment of the present invention, for example, one or more microprocessors (digital signal processor, DSP), or one or more field programmable gate arrays (Field Programmable Gate Array, FPGA).

The processor 21 may perform various functions of the data-network network element by running or executing a software program stored in the memory 22 and by invoking data stored in the memory 22.

In specific implementation, in an embodiment, the processor 21 may include one or more CPUs, for example, a CPU 0 and a CPU 1 shown in FIG. 3.

In specific implementation, in an embodiment, the data-network network element may include a plurality of processors, for example, the processor 21 and a processor 25 shown in FIG. 3. Each of these processors may be a single-core (single-CPU) processor, or may be a multi-core (multi-CPU) processor. The processors herein may refer to one or more data-network network elements, circuits, and/or processing cores configured to process data (for example, a computer program instruction).

The memory 22 may be a read-only memory (read-only memory, ROM), another type of static storage data-network network element that can store static information and an instruction, a random access memory (random access memory, RAM), or another type of dynamic storage data-network network element that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium or another magnetic storage data-network network element, or any other medium that can be configured to carry or store expected program code in an instruction form or a data structure form and that can be accessed by a computer, but the present invention is not limited thereto. The memory 22 may exist independently and be connected to the processor 21 by using the communications bus 24. Alternatively, the memory 22 may be integrated with the processor 21.

The memory 22 is configured to store a software program for performing a solution of the present invention, and the processor 21 controls the performing.

The communications interface 23 may include a sending interface for sending data and a receiving interface for receiving data from an external data-network network element. In other words, the data-network network element may implement data receiving and data sending respectively through two different communications interfaces. Certainly, for the communications interface 23, a data receiving function and a data sending function may be integrated into one communications interface, and the communications interface has the data receiving function and the data sending function.

A structure of the data-network network element shown in FIG. 3 does not constitute any limitation on the data-network network element, and more or fewer components than those shown in the figure may be included, or some components may be combined, or a different component deployment may be used.

Figure 4:
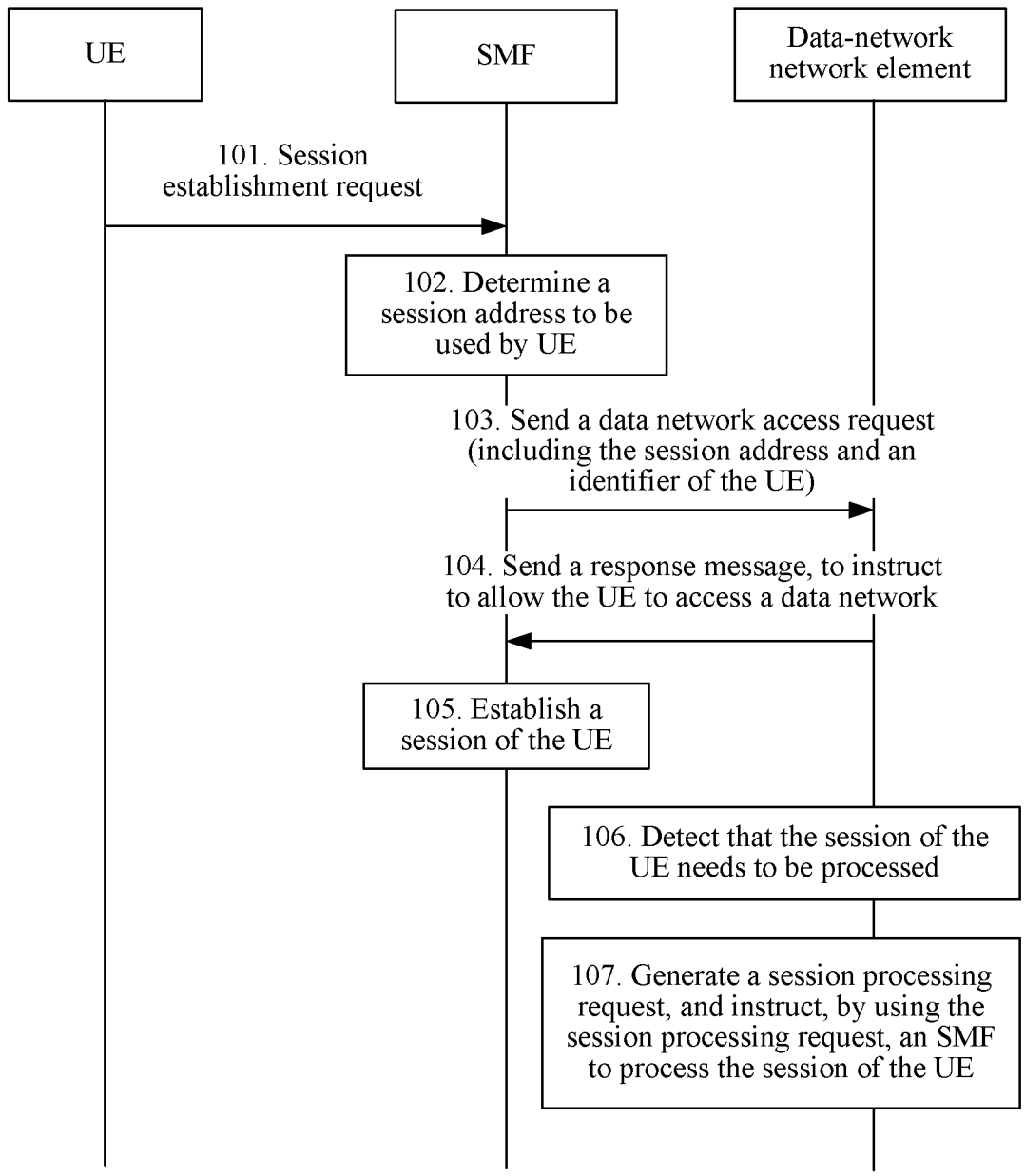
FIG. 4 is a schematic flowchart of a session processing method according to an embodiment of the present invention.

An embodiment of the present invention provides a session processing method. As shown in FIG. 4, the method includes the following steps.

101. An SMF receives a session establishment request from UE.

In specific implementation, the UE first sends the session establishment request to an AMF, and then the AMF forwards, to the SMF, the session establishment request sent by the UE.

In addition, if a type of a PDU sent by the UE is an Ethernet type, an Ethernet-type session (namely, a PDU session) needs to be established for the UE. Further, an address of the session to be established for the UE is an Ethernet address of the UE. In this case, the UE adds the Ethernet address of the UE to the session establishment request and sends the session establishment request to the AMF. It should be noted that, in this embodiment of the present invention, the session established for the UE is the PDU session. Therefore, the "session" in this embodiment of the present invention is particularly the PDU session.

102. The SMF determines a session address to be used by the UE.

In specific implementation, a session of the UE may be established based on an address of the UE. Therefore, the session address to be used by the UE may be the address of the UE. Usually, a type of the established session depends on the type of the PDU transmitted by the UE. The type of the PDU transmitted by the UE includes an IP type, the Ethernet type, and an unstructured type. If the type of the PDU transmitted by the UE is the Ethernet type, the UE adds the Ethernet address of the UE to the session establishment request and sends the session establishment request to the AMF. The SMF receives the session establishment request forwarded by the AMF, and may parse the request to obtain the Ethernet address of the UE included in the request. The Ethernet address is the session address.

If the PDU transmitted by the UE is of the IP type, the SMF allocates an address to the UE. Specifically, if the PDU transmitted by the UE is of an IPv4 type, the session of the UE is also of the IPv4 type. In this case, the SMF allocates an IP address to the UE as the session address to be used by the UE. If the PDU transmitted by the UE is of an IPv6 type, the session of the UE is also of the IPv6 type. In this case, the SMF allocates an IP prefix to the UE as the session address to be used by the UE.

If the PDU transmitted by the UE is of the unstructured type, the SMF also allocates an address to the UE. Specifically, the SMF allocates a tunnel IP address to a UPF, and uses the tunnel IP address of the UPF as the session address to be used by the UE. Alternatively, the SMF allocates a tunnel IP prefix to a UPF, and uses the tunnel IP prefix of the UPF as the session address.

103. The SMF sends a data network access request to a data-network network element, where the data network access request includes the session address and an identifier of the UE.

The data-network network element may be a network element for authentication and authorization in a DN, such as an AAA server or an AAA proxy server.

Specifically, the data network access request may be an authentication request, for example, a DER (diameter EAP request) message, requesting the data-network network element to perform authentication on the UE. Further, the authentication request may further carry an authorization request identifier (identity), requesting the data-network network element to perform authorization on the UE.

Certainly, the data network access request may alternatively be an authorization request, requesting the data-network network element to perform authorization on the UE.

In addition, the identifier of the UE is a secondary ID of the UE. The data-network network element may perform authentication on the UE by using the identifier of the UE.

104. The data-network network element sends a response message to the SMF, where the response message instructs to allow the UE to access the data network.

Specifically, if the data network access request is an authentication request, the data-network network element performs authentication on the UE between step 103 and step 104. In this case, the response message herein is an authentication response message, and the authentication response message carries an authentication success identifier.

If the data network access request is an authentication request, and the authentication request carries an authorization request identifier, the data-network network element performs authentication and authorization on the UE between step 103 and step 104. The response message is an authentication response message, and the message carries an authentication success identifier and an authorization success identifier.

If the data network access request is an authorization request, the data-network network element performs authorization on the UE between step 103 and step 104. In this case, the response message is an authorization response message, and the authorization response message carries an authorization success identifier.

105. The SMF establishes the session of the UE.

An address of the session is the session address determined in step 102. In addition, in step 104, the data-network network element sends the response message to the SMF to instruct to allow the UE to access the data network. Therefore, the SMF further establishes the session for the UE based on the session address.

Specifically, the SMF sends information about the session to be established for the UE to a PCF, and the information includes at least the session address. Optionally, one or more IDs of the UE may be further sent. Subsequently, the PCF sends an authorization range of the session to the SMF.

Subsequently, the SMF informs the UPF of the information about the session, and the information includes the session address and a policy of the session. The UPF ensures that the PDU session does not exceed a range authorized by the PCF. In addition, the UPF replies to the SMF with a response. The SMF sends a session establishment request response to the UE through the AMF. In this way, the establishment of the session of the UE is completed. It should be noted that permission on the session established for the UE herein is "accessible to the data-network network element only".

106. The data-network network element detects that the session of the UE needs to be processed.

The data-network network element may directly determine a session based on the session address received in step 103, and monitor traffic of the session. Once it is detected that the traffic of the session changes, it is determined that the session needs to be processed. It should be noted that a decision made by the data-network network element based on monitoring of the traffic of the session may be "deleting the session of the UE" or "modifying the session of the UE". This is not limited herein. The data-network network element may determine, based on a specific change status of the traffic of the session, how to process the session of the UE. For example, if the traffic of the session is abnormal, the session may need to be deleted. For example, uplink traffic (namely, traffic in a direction from the UE to the DN) of the PDU session may be identified based on a source address or a source tunnel address of the PDU, and a downlink traffic (namely, traffic in a direction from the DN to the UE) of the PDU session may be identified based on a destination address or a destination tunnel address of the PDU. If the type of the PDU is IPv4, an uplink PDU source IP address and a downlink PDU destination IP address are consistent with the IP address (namely, the session address) of the UE. If the type of the PDU is IPv6, an uplink PDU source IP address and a downlink PDU destination IP address match the IP prefix (namely, the session address) of the UE. If the type of the PDU is Ethernet, an uplink PDU source Ethernet address and a downlink PDU destination Ethernet address are consistent with the Ethernet address (namely, the session address) of the UE. If the type of the PDU is unstructured, an uplink PDU source tunnel address and a downlink PDU destination tunnel address match the tunnel IP address or the tunnel IP prefix (namely, the session address) of the UPF.

Alternatively, the data network finds an access state of the UE by using the identifier of the UE as an index, and monitors the access state of the UE, and once the data network detects any case in which the UE is unauthorized UE, a subscription status of the UE changes, or a trust level of the UE changes, the data network may determine that the UE is in an abnormal access state, and further determine that the session of the UE needs to be processed. Further, the data-network network element further needs to determine which session is the session of the UE, and may determine the session of the UE in the following two manners. First, because the data-network network element receives the identifier of the UE and the session address in step 103, the data-network network element may be associated with a session address based on the identifier of the UE, may determine a session (namely, a session corresponding to the identifier of the UE), namely, the session of the UE, based on the associated session address, and may determine that the session needs to be processed. Second, between step 103 and step 104, the data-network network element maintains a corresponding diameter session for each PDU session, and a diameter session has a corresponding ID. In other words, a diameter session ID may be used to identify a PDU session. Therefore, when it is detected that the UE is in the abnormal access state, a diameter session ID may be alternatively associated based on the identifier of the UE, a session (namely, a session corresponding to the identifier of the UE), namely, the session of the UE, may be determined based on the associated diameter session ID, and it may be further determined that the session needs to be processed. It should be noted that a decision made by the data-network network element based on the access state of the UE may be "deleting the session of the UE" or "modifying the session of the UE". This is not limited herein. The data-network network element may determine, based on current actual access of the UE, how to process the session of the UE. For example, if the UE is unauthorized UE, the session of the UE is deleted.

In some embodiments, after the session is established for the UE in step 105, the UE may alternatively initiate authentication to a data-network network element. Therefore, in step 106, the data-network network element may alternatively determine, based on an authentication result, whether the session of the UE needs to be processed. Specifically, if the authentication result is that the authentication fails, it indicates that the UE may be unauthorized UE. In this case, the data-network network element determines that the session of the UE needs to be deleted. If the authentication result is that the authentication succeeds, it indicates that the UE may be valid UE. In this case, the data-network network element determines that the session of the UE needs to be modified, and may modify permission on the session, so that the UE can access a network element other than the data-network network element by using the session. Further, the data-network network element further needs to determine which session is the session of the UE. Similarly, the data-network network element may determine the session of the UE in the foregoing two manners. Specifically, a session address is associated based on the identifier of the UE. In this case, a session matching the address is the session of the UE. Alternatively, a diameter session ID is associated based on the identifier of the UE, and a session matching the diameter session ID is the session of the UE.

In some embodiments, the data-network network element may alternatively start a timer after step 103. After the session is established for the UE in step 105, the timer times out. If the data-network network element does not receive a data packet (namely, the PDU) sent by the UE by using the session, the data-network network element determines that the session of the UE needs to be deleted. Similarly, the data-network network element may determine the session of the UE in the foregoing two manners. Specifically, a session address is associated based on the identifier of the UE. In this case, a session matching the address is the session of the UE. Alternatively, a diameter session ID is associated based on the identifier of the UE, and a session matching the diameter session ID is the session of the UE.

In addition, the data-network network element may alternatively start a timer after step 104. Another procedure is the same as a processing procedure of starting a timer after step 103. Details are not described herein again.

It should be noted that "abnormal traffic" in this embodiment of the present invention may be a feature that traffic deviates from normal service traffic. For example, the traffic is excessively large, a number of an accessed port is not of a current service, accessed addresses are excessive, a data packet size distribution and a normal case differ greatly, or the traffic includes an attack packet.

107. The data-network network element generates a session processing request, and instructs, by using the session processing request, the SMF to process the session of the UE.

In specific implementation, the data-network network element may send the session processing request to the PCF, to request to use an STR message or an AAR message in a diameter protocol. After receiving the request, the PCF triggers the SMF to process the session of the UE. The request includes the session address, used to identify the session. If the data-network network element has sent these pieces of information to the PCF, these pieces of information do not need to be included.

In addition, the data-network network element may alternatively send the request to the SMF, to request to use an ASR message in a diameter protocol. It should be noted that, the session processing request sent in this case does not need to carry the session address. In other words, the session address does not need to be provided for the SMF to identify the session. The SMF and the data-network network element maintain a corresponding diameter session for each PDU session (namely, the session in this embodiment of the present invention) in step 103 and step 104, the SMF may determine, based on a diameter message sent by the data-network network element, which PDU session is to be processed according to an instruction of the data-network network element. Alternatively, a diameter session ID is maintained for each diameter session. The data-network network element may add a diameter session ID to the session processing request, and the SMF may also learn of, based on the received diameter session ID, a PDU session that the data-network network element requests to process.

According to the session processing method provided in this embodiment of the present invention, when the DN performs authentication or authorization on the UE, the SMF provides the session address and the identifier of the UE for the data-network network element, and subsequently establishes the session for the UE based on the session address. When the data-network network element detects that the session of the UE needs to be processed (for example, the traffic of the session changes), the data-network network element may be associated with the session of the UE based on the received session address or the identifier of the user, and send a request to the SMF or the PCF to trigger processing of the session.

Figure 5A:
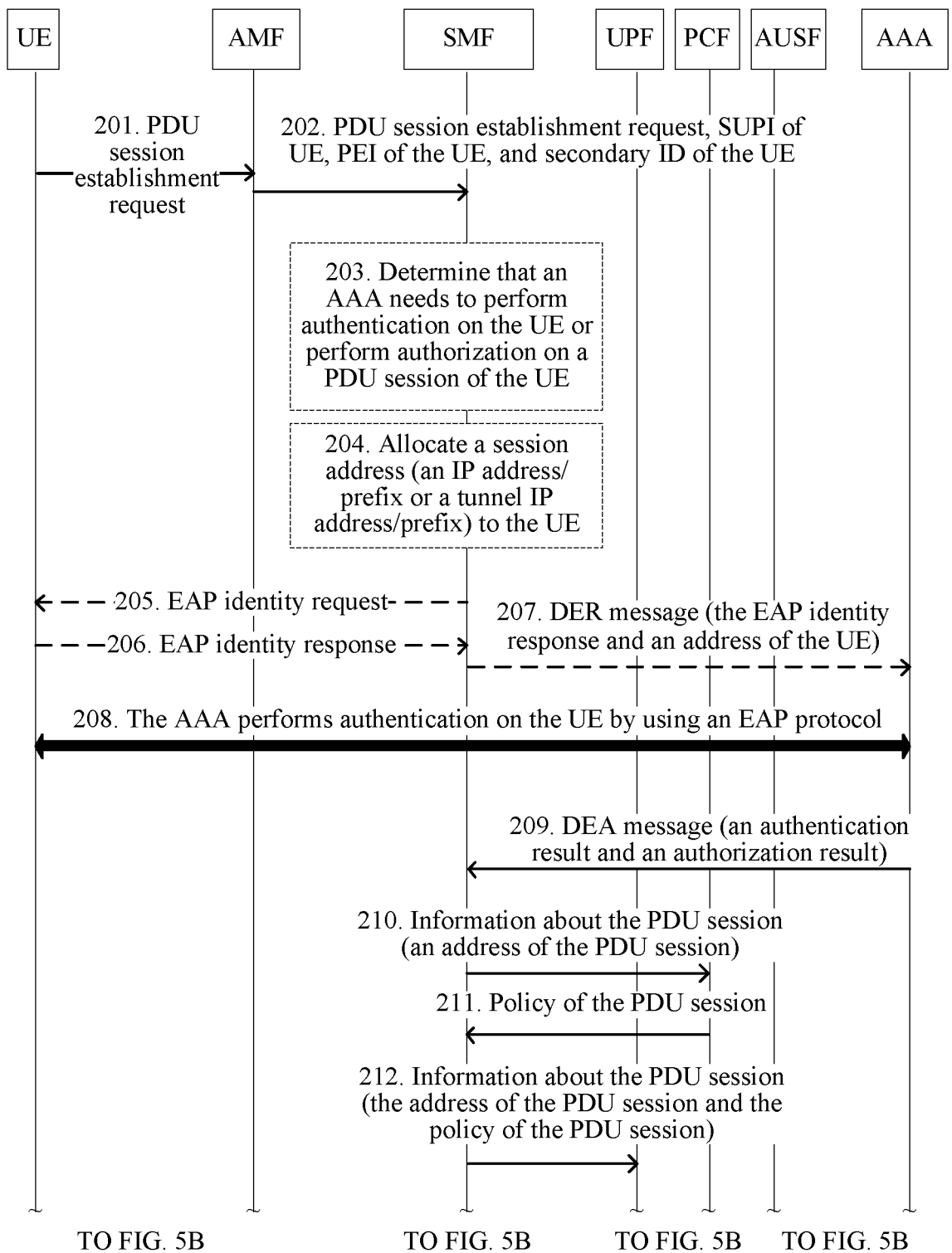
FIG. 5A and FIG. 5B are a schematic flowchart of another session processing method according to an embodiment of the present invention.
Figure 5B:
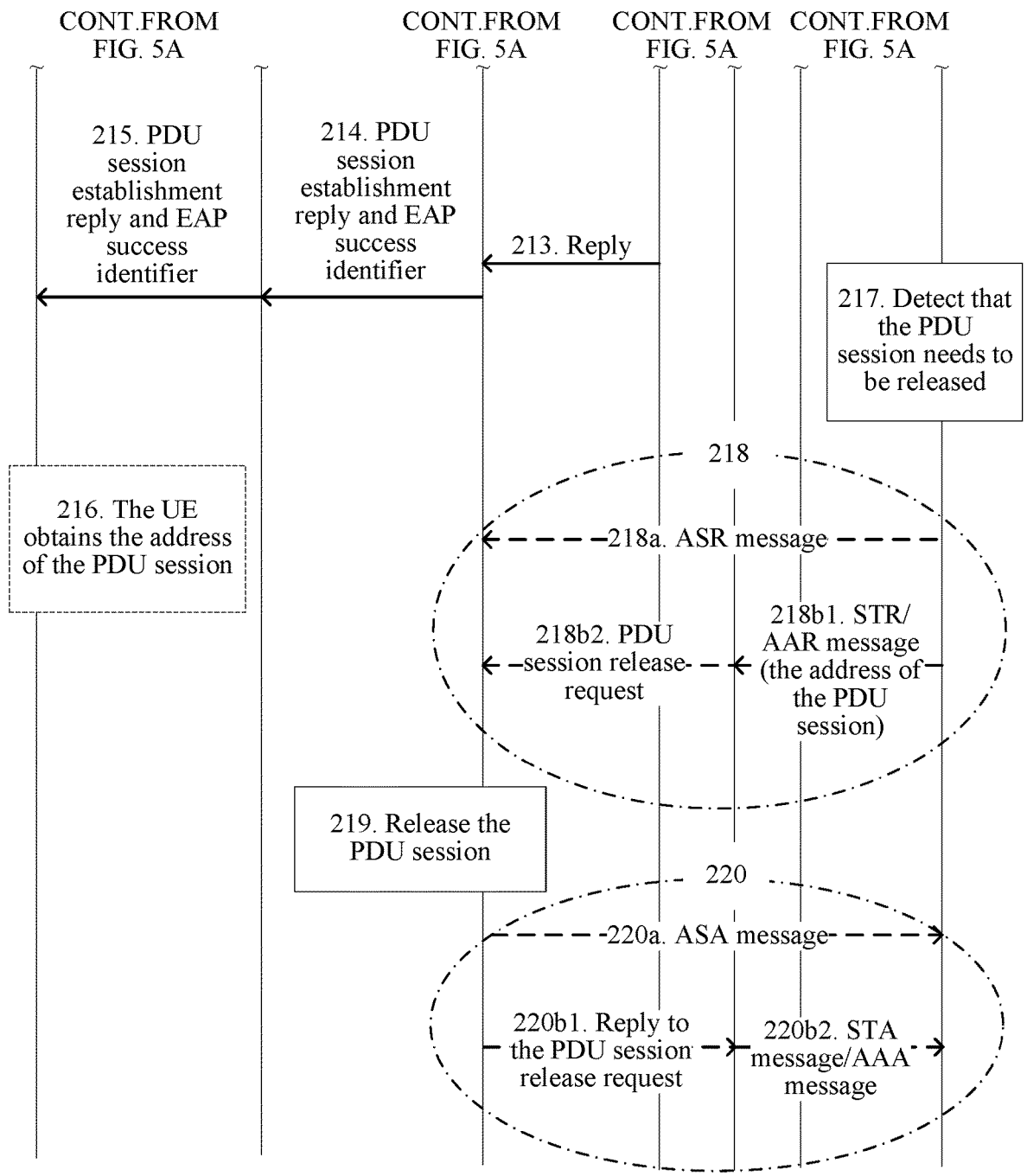

An embodiment of the present invention further provides a session processing method. That a data network element is an AAA is used as an example to describe authentication, authorization, and authorization cancellation performed by the AAA on a PDU session. As shown in FIG. 5A and FIG. 5B, the method includes the following steps.

201. UE sends a PDU session (session) establishment request to an AMF.

If a type of a PDU sent by the UE is an Ethernet type, a type of a PDU session to be established for the UE is also an Ethernet type. In this case, the UE sends both an Ethernet address of the UE and the request to the AMF.

202. The AMF sends the PDU session establishment request of the UE and an SUPI and a PEI of the UE to an SMF.

The PEI herein is a permanent equipment identifier (permanent equipment identifier) of the UE, and is commonly in an IMEI format. Specifically, after receiving the PDU session establishment request of the UE, the AMF adds the SUPI and the PEI of the UE to the PDU session establishment request, and then forwards the request to the SMF.

Optionally: 203. The SMF determines that the AAA needs to perform authentication on the UE or perform authorization on a PDU session of the UE.

In specific implementation, the SMF may determine, based on a locally prestored policy (for example, accessing a DN requires authentication and authorization by the AAA), whether the AAA needs to perform authentication on the UE or perform authorization on the PDU session of the UE. Alternatively, the SMF may use a related instruction carried in the PDU session establishment request sent by the UE, as a determining basis. Alternatively, the SMF may read subscription information of the UE from a UDM between step 202 and step 203, and determine, based on a reading-related policy in the subscription information, whether the AAA needs to perform authentication on the UE or perform authorization on the PDU session of the UE.

204. The SMF allocates a session address to the UE.

It should be noted that, if the type of the PDU session to be established for the UE is the Ethernet type, the SMF uses the Ethernet address of the UE received in step 203, as the session address to be used by the UE, and may skip step 204 and directly perform step 205.

In addition, if the type of the PDU session to be established for the UE is not the Ethernet type, step 204 needs to be performed. Specifically, if the type of the PDU session is IPv4, the SMF allocates an IP address to the UE as the session address to be used by the UE. If the type of the PDU session is IPv6, the SMF allocates an IP prefix to the UE as the session address to be used by the UE. If the type of the PDU session is unstructured, the SMF allocates a tunnel IP address or a tunnel IP prefix to the UE as the session address to be used by the UE. The tunnel IP address or the tunnel IP prefix is allocated to a UPF.

205. The SMF sends an EAP-identity request (EAP-identity request) to the UE.

206. The UE sends an EAP-identity response (EAP-identity response) to the SMF, where the response carries a secondary ID of the UE.

207. The SMF forwards the EAP-identity response and the session address of the UE to the AAA by using a DER message.

The DER message in a diameter protocol is the data network access request described in the embodiments of the present invention, and carries the session address and the identifier of the UE. The identifier of the UE is the secondary ID of the UE described in this embodiment.

It should be noted that, step 205 and step 206 are optional steps. If step 205 and step 206 are performed, after receiving the EAP-identity response message, the SMF generates the DER message that is in the diameter protocol and that includes the EAP-identity response message and the session address, and subsequently, forwards the DER message to the AAA. If step 205 and step 206 are not performed, the UE may add the secondary ID of the UE to the message sent in step 201, and the message forwarded by the AMF to the SMF in step 202 also carries the secondary ID of the UE. In this way, the SMF obtains the secondary ID and the session address of the UE. Further, the SMF generates the DER message that is in the diameter protocol and that carries the secondary ID and the session address of the UE, and sends the generated DER message in the diameter protocol to the AAA.

Optionally, the SMF may further obtain an external ID, an SUPI, and a PEI of the UE from subscription data of the UE, and add the SUPI, the PEI, or the external ID to the DER message in the diameter protocol for joint sending. The external ID is obtained through mapping by using the SUPI, and when a 3GPP network does not intend to expose the SUPI externally, the external ID corresponding to the SUPI may be provided externally.

208. The AAA performs authentication on the UE by using an EAP protocol.

It should be noted that, this step is optional, and the AAA may alternatively not perform authentication on the UE.

209. The AAA sends a diameter DEA message to the SMF, where the message includes an authentication result and an authorization result.

The diameter DEA message sent herein is the response message sent by the data-network network element to the SMF in the embodiments of the present invention.

Specifically, if the authentication result is an EAP-success message, it indicates that the authentication succeeds. The authorization result is authorization information, representing permission on the PDU session to be established for the UE.

It should be noted that, the diameter DEA message sent by the AAA to the SMF may alternatively not include the authorization information, and the SMF may obtain an authorization policy (namely, the foregoing authorization information) from the PCF.

210. The SMF informs a PCF of information about the PDU session, where the information includes an address of the PDU session.

Specifically, the address of the PDU session is the foregoing session address, and may be the Ethernet address sent by the UE to the AMF in step 201, or may be the address allocated by the SMF to the UE in step 204.

Optionally, one or more IDs of the UE may be further included, for example, the secondary ID of the UE, and the external ID of the UE.

211. The PCF sends a policy of the PDU session to the SMF.

212. The SMF informs a UPF of information about the PDU session, where the information includes the address of the PDU session and the policy of the PDU session.

In addition, the UPF ensures, by performing the policy of the PDU session, that the PDU session does not exceed an authorized range.

213. The UPF returns a reply to the SMF.

214. The SMF sends a PDU session establishment reply and EAP-success (an EAP success identifier) indicating that the authentication succeeds, to the AMF.

215. The AMF forwards the received PDU session establishment reply and EAP-success to the UE.

216. The UE obtains the address of the PDU session.

If the PDU sent by the UE is the Ethernet type, the address of the PDU session is the Ethernet address of the UE. Herein, step 216 is not performed, and step 217 is directly performed.

If the type of the PDU is not the Ethernet type, but is, for example, an IP type or an unstructured type, the address of the PDU session is allocated by the SMF to the UE, and the SMF sends, to the UE by using another message, the address allocated to the UE, for example, sends the address by using a message of a dynamic host configuration protocol (dynamic host configuration protocol, DHCP). In addition, a message may be alternatively sent in step 214 and step 215 to notify the address allocated to the UE.

217. The AAA detects that the PDU session needs to be released.

It should be noted that, releasing the PDU session herein is deleting the PDU session.

Specifically, the DN may identify traffic of the PDU session by using the address obtained in step 207, and when the DN detects that the traffic of the PDU session is abnormal, the DN determines that the PDU session of the UE needs to be deleted.

Specific traffic monitoring includes that uplink traffic (namely, traffic in a direction from the UE to the DN) of the PDU session may be identified based on a source address or a source tunnel address of the PDU, and downlink traffic (namely, traffic in a direction from the DN to the UE) of the PDU session may be identified based on a destination address or a destination tunnel address of the PDU. Specifically, if the type of the PDU is IPv4, an uplink PDU source IP address and a downlink PDU destination IP address are consistent with the IP address (namely, the session address, and also the address of the PDU session) obtained in step 207. If the type of the PDU is IPv6, an uplink PDU source IP address and a downlink PDU destination IP address match the IP prefix (namely, the session address, and also the address of the PDU session) obtained in step 207. If the type of the PDU is Ethernet, an uplink PDU source Ethernet address and a downlink PDU destination Ethernet address are consistent with the Ethernet address (namely, the session address, and also the address of the PDU session) obtained in step 207. If the type of the PDU is unstructured, an uplink PDU source tunnel address and a downlink PDU destination tunnel address match the tunnel IP address or the tunnel IP prefix (namely, the session address, and also the address of the PDU session) obtained in step 207.

Alternatively, when the AAA detects that subscription of the UE to the DN is canceled, the secondary ID of the UE is associated with a session address, and the AAA determines that a PDU session corresponding to an address of the UE needs to be released. It should be noted that, in this embodiment, "releasing" is "deleting".

218. The AAA sends a PDU session release request.

Specifically, the AAA may directly send the request to the SMF by using an ASR message in a diameter protocol (step 218a). It should be noted that, the message sent by the AAA herein does not carry the PDU session. In other words, the address of the PDU session does not need to be provided for the SMF to identify the PDU session. The SMF and the AAA maintain a corresponding diameter session for each PDU session. However, in the figure, four diameter messages in 207, 209, 218a, and 220a are all in a same diameter session. The AAA requests, in the diameter session corresponding to the PDU session, to release or modify the PDU session. The SMF may learn that the PDU session requested to be operated is the PDU session corresponding to the session.

Alternatively, the AAA sends the request to the PCF by using an STR message in the diameter protocol or an AAR message in the diameter protocol (step 218b1). The PCF sends the PDU session release request to the SMF to trigger the SMF to release the PDU session (step 218b2). The request sent by the AAA includes the address of the PDU session, is used to identify the PDU session, and may further include one or more IDs of the UE for assisting in identifying the PDU session. In addition, if the AAA has sent these pieces of information to the PCF (for example, the AAA has sent a PDU session modification request by using the PCF, and the request includes these pieces of information), these pieces of information do not need to be included.

219. The SMF releases the PDU session.

Specifically, the SMF instructs the UPF to release a resource occupied by the PDU session, and stops forwarding the PDU of the PDU session. The SMF instructs an (R)AN to release the resource of the PDU session, and the notification is forwarded by the AMF. Subsequently, the (R)AN releases the resource occupied by the PDU session, and notify the UE of this. The (R)AN notifies the SMF that the resource occupied by the PDU session has been released, and the notification is forwarded by the AMF. Finally, the SMF instructs the AMF to delete context information of the PDU session, and the SMF instructs the PCF to delete policy context information of the PDU session.

220. The AAA receives a reply to the PDU session release request.

Corresponding to step 218a, the SMF sends the reply to the PDU session release request to the AAA by using the ASA message in the diameter protocol (step 220a).

Corresponding to step 218b1 and step 218b2, the SMF sends the reply to the PDU session release request to the PCF (step 220b1), and the PCF sends the reply to the PDU session release request to the AAA by using the STA message or the AAA message in the diameter protocol (step 220b2).

The address of the PDU session in the foregoing step is as follows: If the type of the PDU session is IPv4, the address of the PDU session (namely, the foregoing session address) is the IP address allocated by the SMF to the UE. If the type of the PDU session is IPv6, the address of the PDU session is the IP prefix allocated by the SMF to the UE. If the type of the PDU session is unstructured, the address of the PDU session is the tunnel IP address or the tunnel IP prefix allocated by the SMF to the UE. If the type of the PDU session is Ethernet, the address of the PDU session is the Ethernet address of the UE.

In this embodiment of the present invention, the SMF obtains the Ethernet address of the UE in step 202, or allocates, in step 204 to the UE, an IP address/a prefix used by the UE or a tunnel. In step 207, the SMF adds these addresses to a diameter message of an authentication/authorization request and sends the message to the AAA, so that the AAA can identify the PDU of the PDU session and determine, by detecting the PDU of the PDU session, whether traffic of the PDU session is abnormal. Once detecting that the traffic of the PDU session is abnormal, the AAA triggers, by using the PCF, modification or release of the PDU session. Therefore, the DN can control deletion and modification of the PDU session based on a detected abnormal case, so that effective access control can be achieved.

Figure 6A:
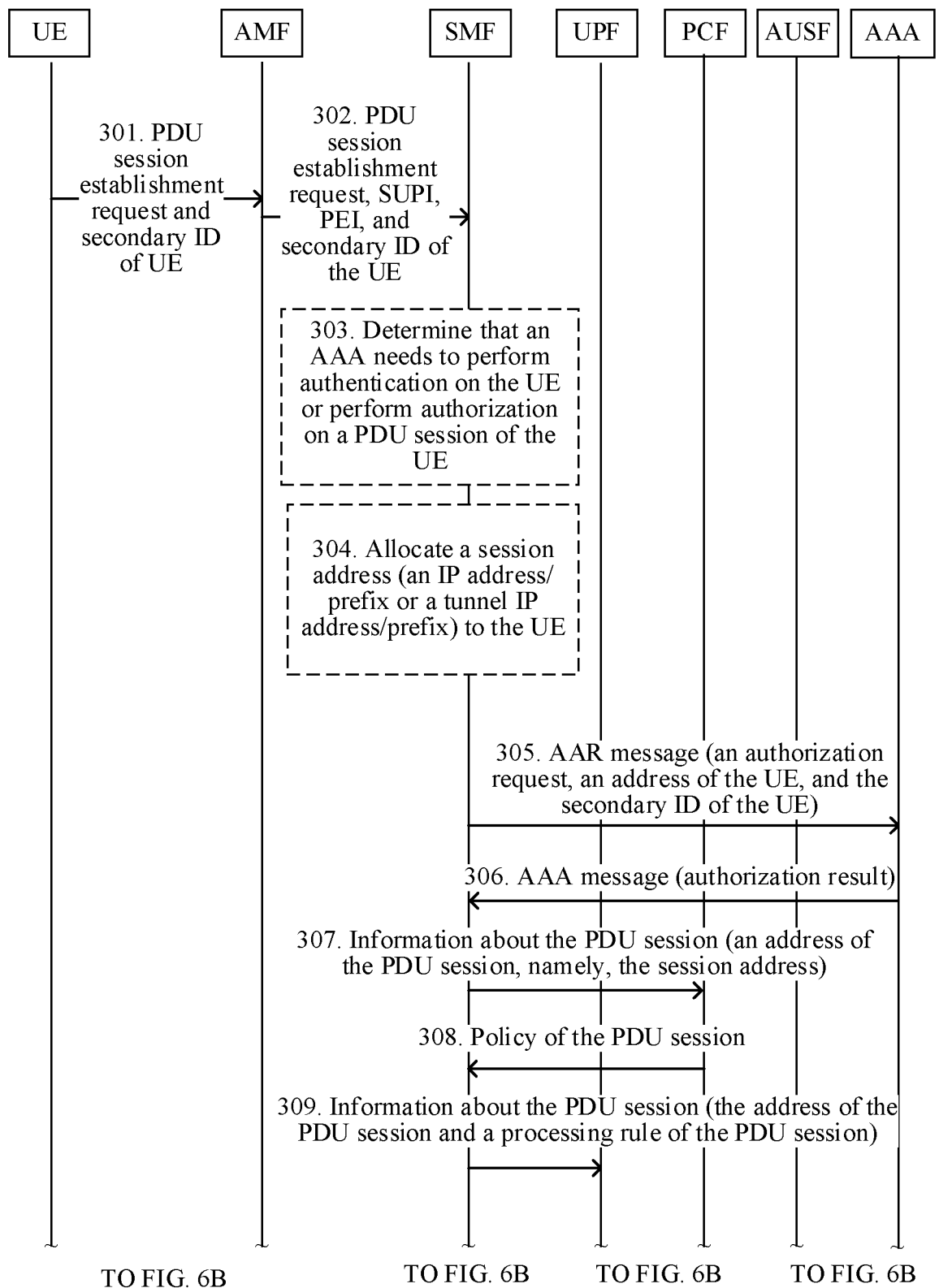
FIG. 6A and FIG. 6B are a schematic flowchart of another session processing method according to an embodiment of the present invention.
Figure 6B:
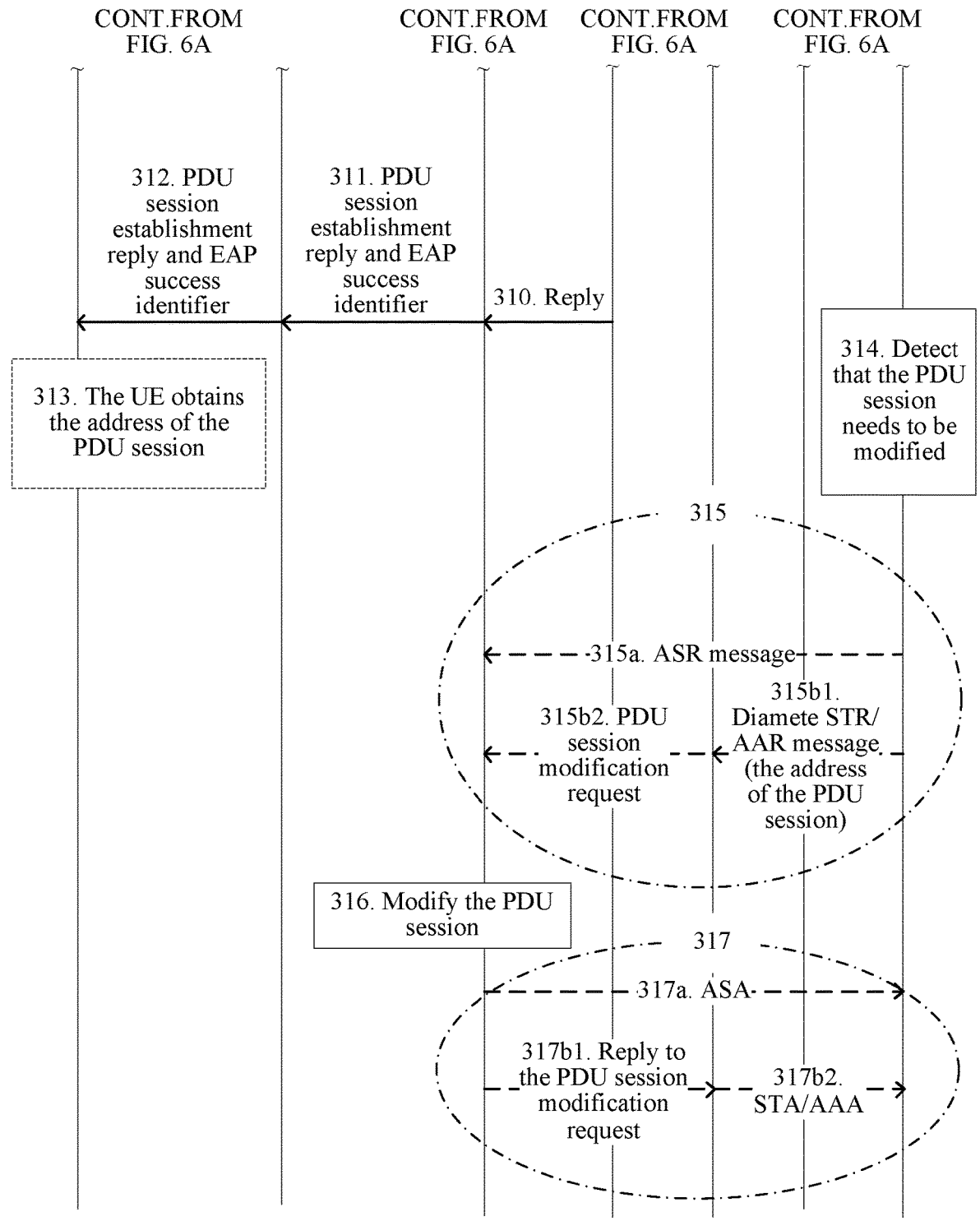

An embodiment of the present invention further provides a session processing method. That a data network element is an AAA is used as an example. An authorization procedure for establishing a PDU session and an authorization modification procedure is different from that in the foregoing embodiment. In this embodiment, before a PDU session is established, the AAA performs only authorization, and does not perform authentication on a UE, and does not use an EAP protocol. In addition, in this embodiment, the AAA triggers PDU session modification instead of triggering PDU session release. A PDU session establishment process in this embodiment and that in Embodiment 1 may be interchanged, without affecting a subsequent PDU session modification/release triggering procedure. As shown in FIG. 6A and FIG. 6B, the method includes the following steps.

301. UE sends a PDU session establishment request message and a secondary ID of the UE to an AMF.

It should be noted that, if a type of a PDU session is Ethernet, the UE sends both an Ethernet address of the UE and the request to the AMF.

302. The AMF sends the PDU session establishment request of the UE, an SUPI of the UE, a PEI of the UE, and the secondary ID of the UE to an SMF.

Certainly, if the type of the PDU session is Ethernet, the AMF receives the Ethernet address sent by the UE, and also needs to send the Ethernet address of the UE to the SMF herein.

Optionally: 303. The SMF determines that the AAA needs to perform authentication on the UE or perform authorization on a PDU session of the UE.

Similarly, the SMF may determine, based on a locally prestored policy (for example, accessing the DN requires authentication and authorization by the AAA), whether the AAA needs to perform authentication on the UE or perform authorization on the PDU session of the UE. Alternatively, the SMF may use a related instruction carried in the PDU session establishment request sent by the UE, as a determining basis. Alternatively, the SMF may read subscription information of the UE from a UDM between step 302 and step 303, and determine, based on a reading-related policy in the subscription information, whether the AAA needs to perform authentication on the UE or perform authorization on the PDU session of the UE.

304. The SMF allocates a session address to the UE.

It should be noted that, if the type of the PDU session to be established for the UE is the Ethernet type, the SMF uses the Ethernet address of the UE received in step 303, as the session address to be used by the UE, and may skip step 304 and directly perform step 305.

In addition, if the type of the PDU session to be established for the UE is not the Ethernet type, step 304 needs to be performed. Specifically, if the type of the PDU session is IPv4, the SMF allocates an IP address to the UE as the session address to be used by the UE. If the type of the PDU session is IPv6, the SMF allocates an IP prefix to the UE as the session address to be used by the UE. If the type of the PDU session is unstructured, the SMF allocates a tunnel IP address or a tunnel IP prefix to the UE as the session address to be used by the UE. The tunnel IP address or the tunnel IP prefix is allocated to a UPF.

305. The SMF sends an AAR message in a diameter protocol to the AAA, where the message carries an authorization request, the session address, and the secondary ID of the UE.

Optionally, the SMF may further find an external ID of the UE from subscription data of the UE, add the SUPI, the PEI, or the external ID of the UE to the AAR message in the diameter protocol, and send the AAR message to the AAA.

306. The AAA sends an AAA message in the diameter protocol to the SMF, where the AAA message includes an authorization result.

The authorization result may be authorization information, indicating permission on the PDU session to be established for the UE.

307. The SMF informs a PCF of information about the PDU session, where the information includes an address of the PDU session (namely, the foregoing session address).

Optionally, the information about the PDU session may further include one or more IDs of the UE.

308. The PCF sends a policy of the PDU session to the SMF.

309. The SMF informs a UPF of information about the PDU session, where the information includes the address of the PDU session and a processing rule of the PDU session.

It should be noted that, the processing rule of the PDU session is generated by the SMF based on the received policy of the PDU session, and the UPF ensures, by performing the processing rule of the PDU session, that the PDU session does not exceed an authorized range.

310. The UPF replies to the SMF with a response.

311. The SMF sends a PDU session establishment reply to the AMF.

312. The AMF forwards the PDU session establishment reply to the UE.

313. The UE obtains the address of the PDU session.

If a PDU sent by the UE is the Ethernet type, the address of the PDU session is the Ethernet address of the UE. If a type of the PDU is not the Ethernet type, but is, for example, an IP type or an unstructured type, the address of the PDU session is allocated by the SMF to the UE, and the SMF sends, to the UE by using another message, the session address allocated to the UE, for example, sends the address by using a message of a DHCP protocol. In addition, a message may be alternatively sent in step 314 and step 315 to notify the session address allocated to the UE.

314. The AAA detects that the PDU session needs to be modified.

Specifically, the AAA detects, based on the ID (obtained in step 307) of the UE, that subscription of the UE to the DN is modified, or the DN detects that a trust level or credibility of the UE changes, or the DN detects that traffic of the PDU session is abnormal. For a specific method for monitoring the traffic, refer to a related explanation of step 217 in the foregoing embodiment. Details are not described herein again.

315. The AAA sends a PDU session modification request.

In specific implementation, the AAA may send the PDU session modification request to the SMF by using an RAR message in the diameter protocol (step 315a). It should be noted that, the message sent by the AAA herein does not carry the PDU session. In other words, the address of the PDU session does not need to be provided for the SMF to identify the PDU session. The SMF and the AAA maintain a corresponding diameter session for each PDU session. However, in the figure, four diameter messages in 305, 306, 315a, and 317a are all in a same diameter session. The AAA requests, in the diameter session corresponding to the PDU session, to release or modify the PDU session. The SMF may learn that the PDU session requested to be operated is the PDU session corresponding to the session.

Alternatively, the AAA sends the PDU session modification request to the PCF by using the AAR message in the diameter protocol (step 315b1), and the PCF further triggers the SMF to modify the PDU session (step 315b2). The request sent by the AAA includes the address of the PDU session, is used to identify the PDU session, and may further include one or more IDs of the UE for assisting in identifying the PDU session. In addition, if the AAA has sent these pieces of information to the PCF (for example, the AAA has sent the PDU session modification request by using the PCF, and the request includes these pieces of information), these pieces of information do not need to be included.

316. The SMF modifies the PDU session.

Specifically, the SMF requests an (R)AN to modify a configuration of the PDU session, and the request is forwarded by the AMF. Next, the (R)AN notifies the UE of the modification of the PDU session. The (R)AN notifies the SMF that the configuration of the PDU session has been modified, and the notification is forwarded by the AMF. Subsequently, the SMF requests the UPF to modify the configuration of the PDU session, and obtains a response.

317. The AAA receives a reply to the PDU session modification request.

Corresponding to step 315a, the SMF sends a message to the AAA, and the message is an RAA message in the diameter protocol (step 317a).

Alternatively, corresponding to step 315b1, the PCF receives the reply to the PDU session modification request sent by the SMF (step 317b1), and the PCF sends the reply to the PDU session modification request to the AAA by using the AAA message in the diameter protocol (step 317b2).

The address in the foregoing step is as follows: If the type of the PDU session is IPv4, the address is the IP address allocated by the SMF to the UE. If the type of the PDU session is IPv6, the address is the IP prefix allocated by the SMF to the UE. If the type of the PDU session is unstructured, the address is the tunnel IP address or the tunnel IP prefix allocated by the SMF to the UE. If the type of the PDU session is Ethernet, the address is the Ethernet address of the UE.

Compared with the prior art, in this embodiment, the SMF obtains the Ethernet address of the UE in step 302, or allocates, in step 304 to the UE, an IP address/a prefix used by a session or a tunnel. In step 305, the SMF adds these addresses to a diameter message of an authorization request and sends the message to the AAA, so that the DN can identify the PDU of the PDU session and detect whether an anomaly exists, or determine a trust level or a credit of the UE based on this, and further determine that the PDU session needs to be modified. Alternatively, when a subscription condition of the UE changes, the AAA may be associated with the PDU session, and determine to modify the PDU session. Further, the AAA triggers the modification of the PDU session by using the PCF.

Figure 7A:
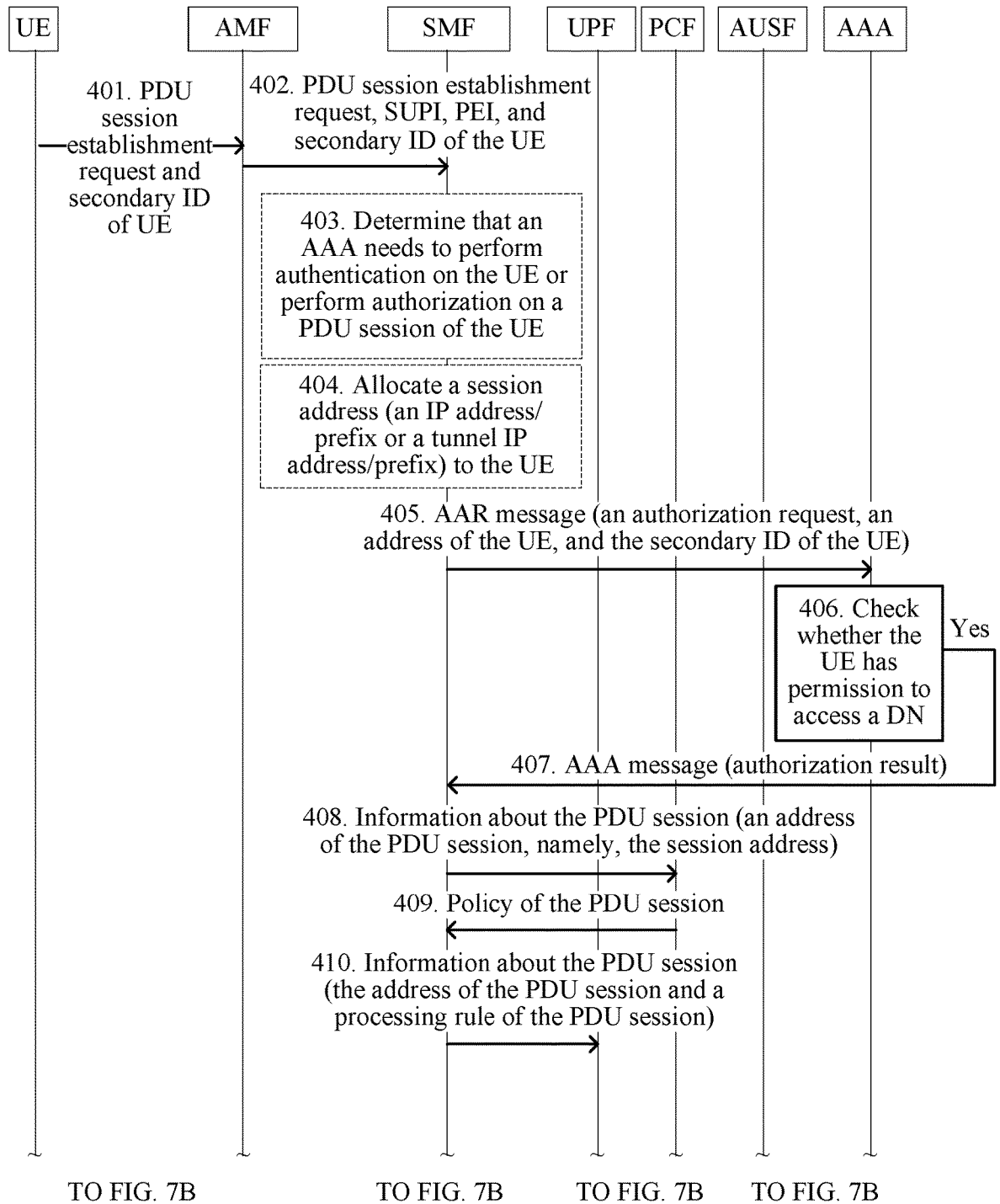
FIG. 7A and FIG. 7B are a schematic flowchart of another session processing method according to an embodiment of the present invention.
Figure 7B:
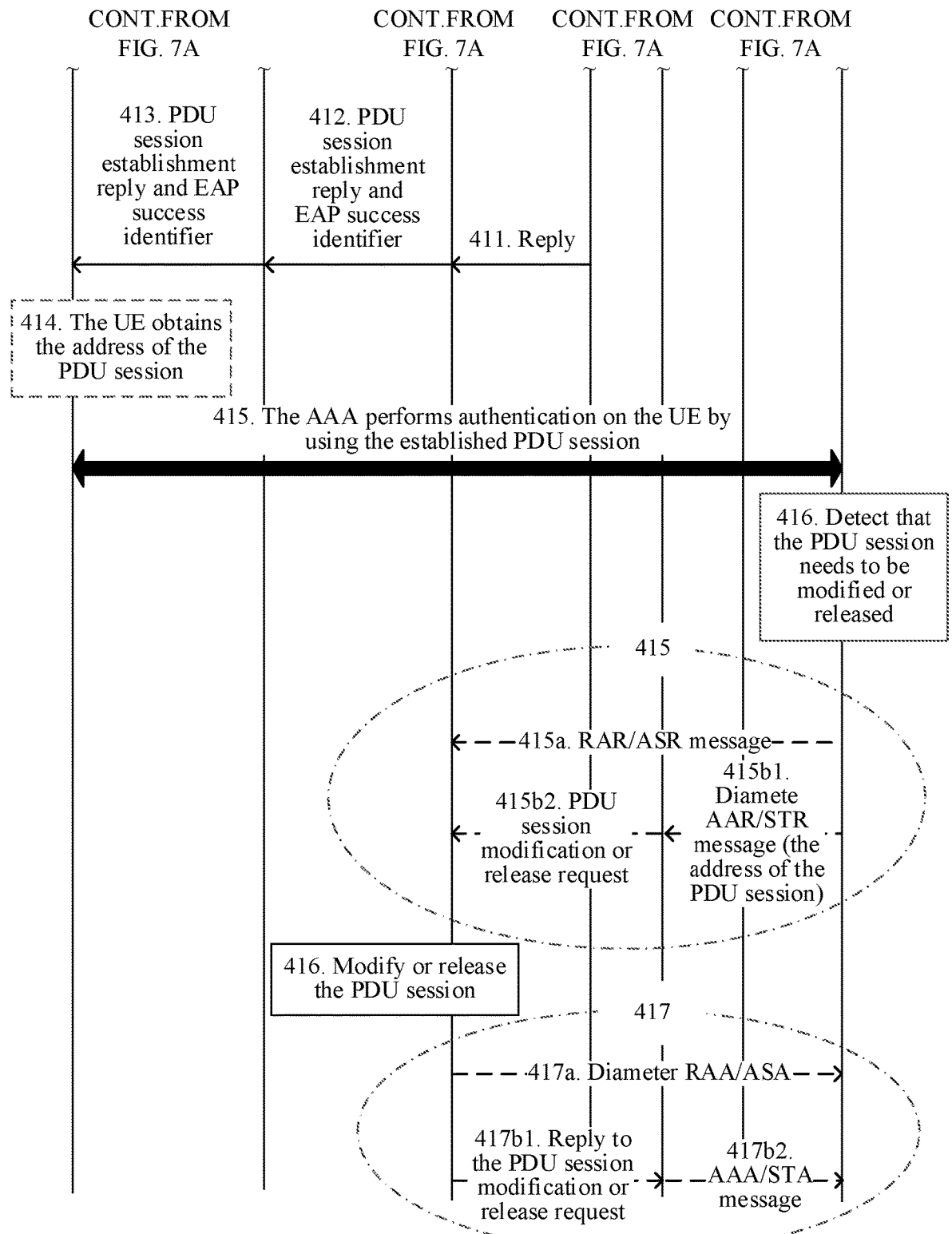

An embodiment of the present invention further provides a session processing method. That a data network element is an AAA is used as an example to describe authentication on a user plane by the AAA by using authorization provisioning and authorization modification or cancellation of a PDU session. As shown in FIG. 7A and FIG. 7B, the method includes the following steps.

401. UE sends a PDU session establishment request and a secondary ID of the UE to an AMF.

Certainly, if a type of a PDU session is an Ethernet type, the UE sends both an Ethernet address of the UE and the request to the AMF.

402. The AMF sends the PDU session establishment request of the UE, an SUPI of the UE, a PEI of the UE, and the secondary ID of the UE to an SMF.

If the type of the PDU session is Ethernet, the Ethernet address of the UE is also sent to the SMF.

Optionally: 403. The SMF determines that the AAA needs to perform authentication on the UE or perform authorization on a PDU session of the UE.

In specific implementation, the SMF may determine, based on a locally prestored policy (for example, accessing the DN requires authentication and authorization by the AAA), whether the AAA needs to perform authentication on the UE or perform authorization on the PDU session of the UE. Alternatively, the SMF may use a related instruction carried in the PDU session establishment request sent by the UE, as a determining basis. Alternatively, the SMF may read subscription information of the UE from a UDM between step 402 and step 403, and determine, based on a reading-related policy in the subscription information, whether the AAA needs to perform authentication on the UE or perform authorization on the PDU session of the UE.

404. The SMF allocates a session address to the UE.

It should be noted that, if the type of the PDU session to be established for the UE is the Ethernet type, the SMF uses the Ethernet address of the UE received in step 403, as the session address to be used by the UE, namely, the foregoing session address, and may skip step 404 and directly perform step 405.

In addition, if the type of the PDU session to be established for the UE is not the Ethernet type, step 404 needs to be performed. Specifically, if the type of the PDU session is IPv4, the SMF allocates an IP address to the UE as the session address to be used by the UE. If the type of the PDU session is IPv6, the SMF allocates an IP prefix to the UE as the session address to be used by the UE. If the type of the PDU session is unstructured, the SMF allocates a tunnel IP address or a tunnel IP prefix to the UE as the session address to be used by the UE. The tunnel IP address or the tunnel IP prefix is allocated to a UPF.

405. The SMF sends an authorization request to the AAA, and also sends the session address and the secondary ID of the UE to the AAA.

Optionally, the SMF may further send any one or more of the SUPI of the UE, the PEI of the UE, and an external ID of the UE to the AAA. The SMF may find the external ID of the UE in subscription data of the UE. In specific implementation, the SMF may send a to-be-sent message to the AAA by using an AAR message in a diameter protocol.

Optionally: 406. The AAA checks whether the UE has permission to access a DN. If the UE has no permission to access the DN, a message indicating that the authorization fails is returned. If the UE has permission to access the DN, the procedure continues.

407. The AAA sends an AAA message in the diameter protocol to the SMF, where the AAA message includes an authorization result.

The authorization result is authorization information, indicating permission on the PDU session to be established for the UE. Optionally, the authorization information indicates that the PDU session is allowed to access only the AAA. Further, a maximum transmission rate of the PDU session may be limited to a relatively small value.

In some embodiments, optionally, permission on the PDU session is allowing to access the AAA and a DNS server and/or a DHCP server. The PDU session is allowed to access the DHCP server, so that the UE can obtain the IP address by using a DHCP. The PDU session is allowed to access the DNS server, so that the UE can search for an address of the AAA/an AAA proxy by using the DNS.

408. The SMF informs a PCF of information about the PDU session, where the information includes an address of the PDU session (namely, the foregoing session address).

Optionally, the SMF may further send one or more IDs of the UE to the PCF.

409. The PCF sends a policy of the PDU session to the SMF.

Optionally, the policy of the PDU session indicates that the PDU session is allowed to access only the AAA, and further, may indicate a threshold of the maximum transmission rate of the PDU session, and the threshold is a relatively low transmission rate.

It should be noted that, at least one of step 407 and step 409 indicates that the PDU session is allowed to access only the AAA.

410. The SMF informs a UPF of information about the PDU session, where the information includes the address and a processing rule of the PDU session.

It should be noted that, the processing rule of the PDU session is generated by the SMF based on the received policy of the PDU session, and the UPF ensures, by performing the processing rule of the PDU session, that the PDU session does not exceed an authorized range. Specifically, the processing rule may indicate that the PDU session is allowed to access only the AAA, and the maximum transmission rate of the PDU session should not exceed a threshold.

411. The UPF replies to the SMF with a response.

412. The SMF sends a PDU session establishment reply to the AMF.

413. The AMF forwards the PDU session establishment reply to the UE.

414. The UE obtains the address of the PDU session.

If the PDU sent by the UE is the Ethernet type, the address of the PDU session is the Ethernet address of the UE. If the type of the PDU is not the Ethernet type, but is, for example, an IP type or an unstructured type, the address of the PDU session is allocated by the SMF to the UE, and the SMF sends, to the UE by using another message, the address allocated to the UE, for example, sends the address by using a message of a DHCP protocol. In addition, a message may be alternatively sent between step 414 and step 415 to notify the address allocated to the UE.

415. The AAA performs authentication on the UE by using the established PDU session.

Specifically, an authentication message is transmitted by using a PDU. If a type of the PDU is IP, any IP-protocol-based authentication protocol, for example, a SIP protocol, may be used. If a type of the PDU is Ethernet, any Ethernet-based authentication protocol, for example, a PPPoE protocol and an EAPoL protocol, may be used.

416. The AAA determines, based on an authentication result, that the PDU session needs to be modified or released.

Specifically, if the authentication succeeds, the AAA determines that the PDU session needs to be modified, so that the PDU session can access a network element other than the AAA, and/or the UE can access a network element other than the AAA at a higher transmission rate by using the PDU session. If the authentication succeeds, the AAA determines that the PDU session needs to be released.

In addition, a correspondence between the authentication result and the PDU session may be determined based on the address of the PDU session. For example, a source address or a source tunnel address of the PDU carrying the authentication result is the address of the PDU session corresponding to the authentication result.

417. Based on the result of step 416, the AAA sends a PDU session modification request or a PDU session release request.

417a. The request may be sent to the SMF. If the request is the PDU session modification request, an RAR message in the diameter protocol is used. If the request is the PDU session release request, an ASR message in the diameter protocol is used.

417b1. The request may be alternatively sent to the PCF. If the request is the PDU session modification request, an AAR message in the diameter protocol is used. If the request is the PDU session release request, an AAR message or an STR message in the diameter protocol is used. The request sent by the AAA includes the address of the PDU session, is used to identify the PDU session, and may further include one or more IDs of the UE for assisting in identifying the PDU session. In addition, if the AAA has sent these pieces of information to the PCF (for example, the AAA has sent the PDU session modification request by using the PCF, and the request includes these pieces of information), these pieces of information do not need to be included.

417b2. The PCF further triggers the SMF to modify or release the PDU session.

418. The SMF modifies or releases the PDU session.

419. The AAA receives a reply to modifying the PDU session or a reply to releasing the PDU session.

Corresponding to 419a, the reply may be sent by the SMF to the AAA (step 419a). If the reply is the reply to modifying the PDU session, a reply message is an RAA message in the diameter protocol. If the reply is the reply to releasing the PDU session, a reply message is an ASA message in the diameter protocol.

Corresponding to 417b1, the PCF receives the reply from the SMF (step 419b1). Further, the PCF sends the reply to the AAA (step 419b2). If the reply is the reply to modifying the PDU session, the reply message sent by the PCF is the AAA message (the message in the diameter protocol and an AAA network element in a standard have a same name) in the diameter protocol. If the reply is the reply to releasing the PDU session, the reply message is the AAA message or a STA message in the diameter protocol.

In this embodiment, the SMF obtains the Ethernet address of the UE, or allocates, to the UE, an IP address/a prefix used by the UE or a tunnel. The SMF adds these addresses to a diameter message of the authorization request and sends the diameter message to the AAA, so that the DN can identify the PDU of the PDU session, and can be associated with the PDU session corresponding to the authentication result when performing authentication on the UE again after the PDU session is established. Further, when the authentication succeeds or fails, the AAA learns of a PDU session whose modification or release should be triggered. Moreover, in this embodiment, the AAA is used to trigger modification and release of the PDU session, so that a plurality of authentication protocols are supported, and a 3GPP network does not need to be additionally updated.

Figure 8A:
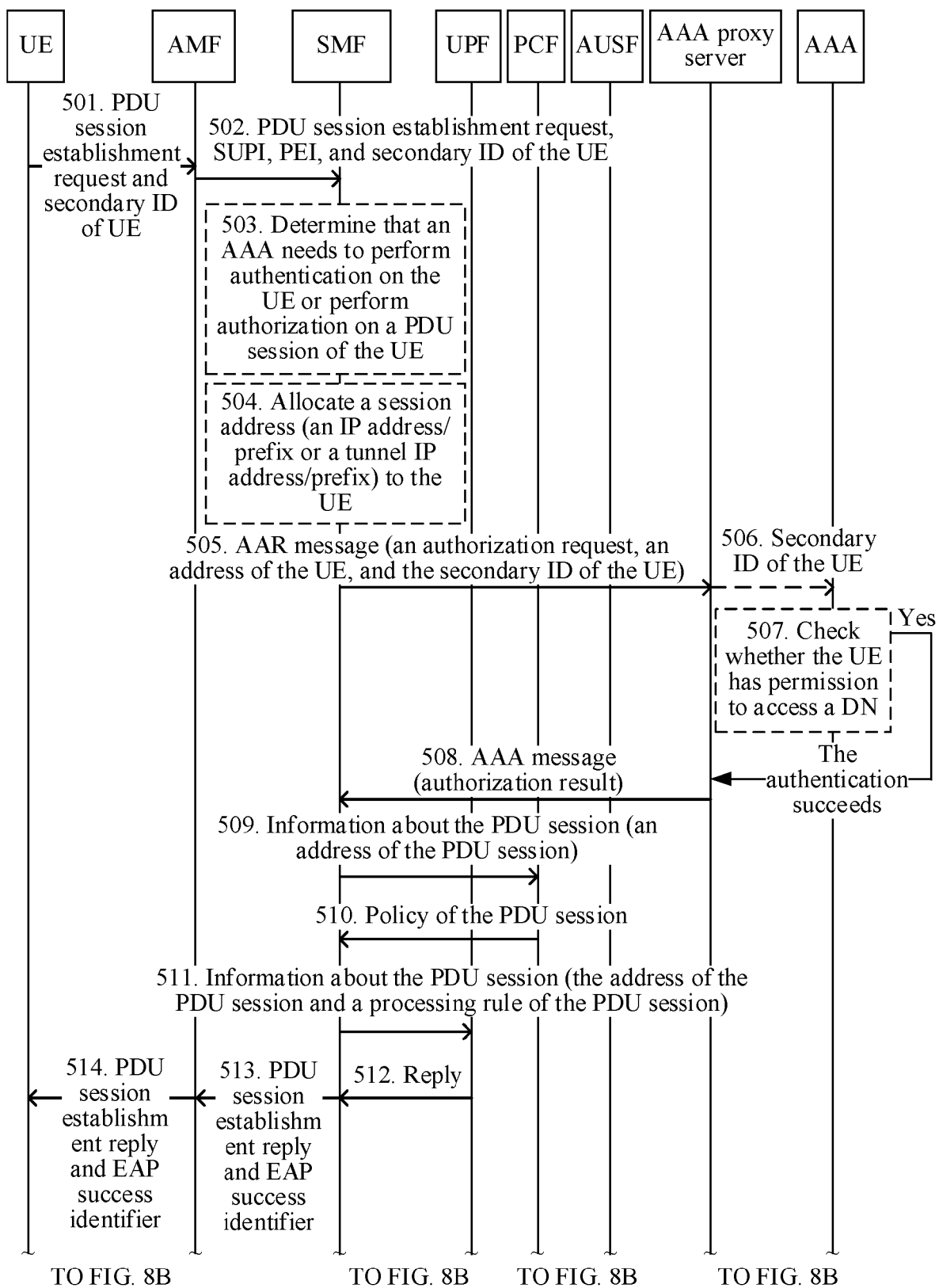
FIGS. 8A and 8B are a schematic flowchart of another session processing method according to an embodiment of the present invention.
Figure 8B:
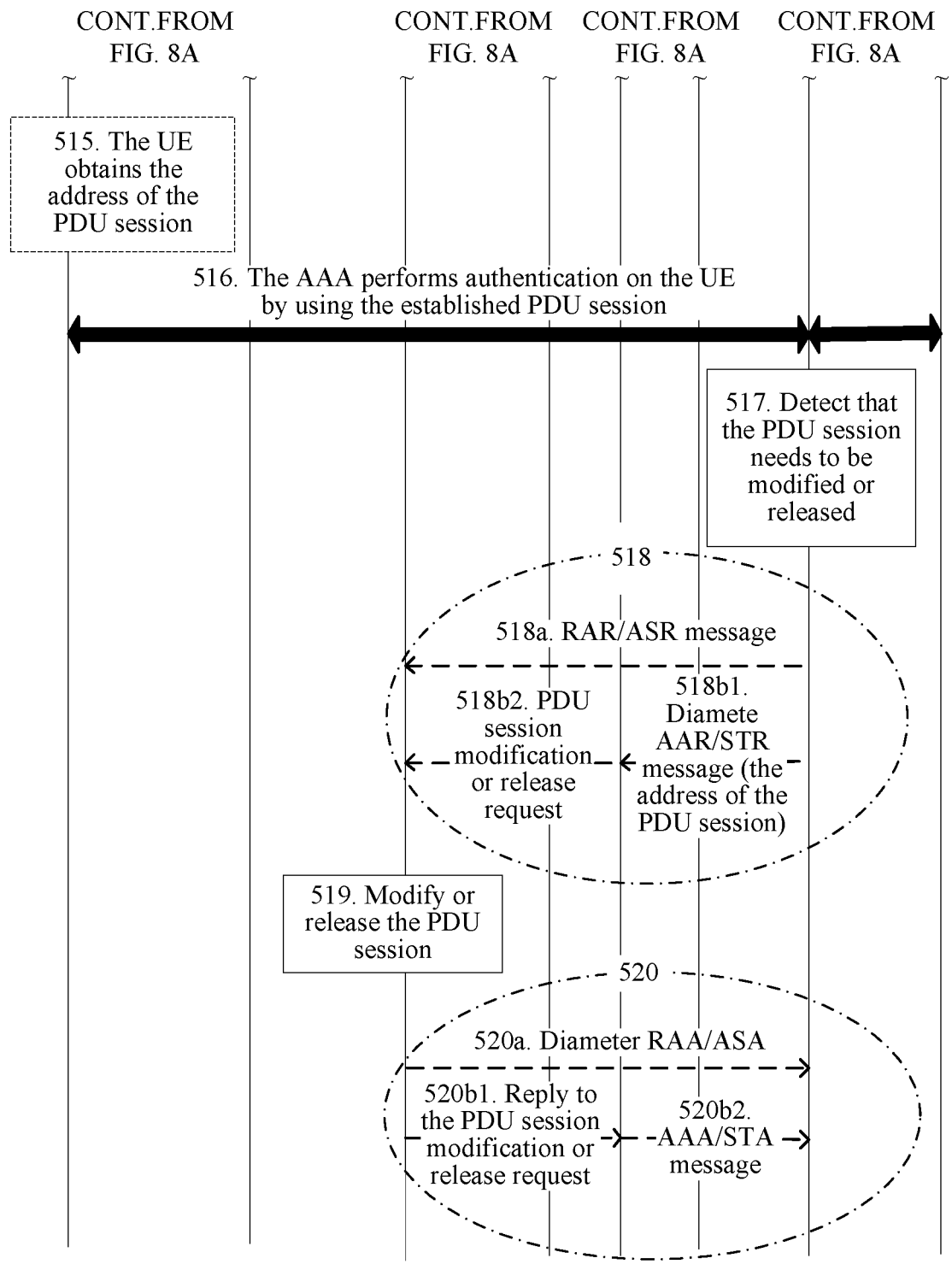

An embodiment of the present invention further provides a session processing method. That a data network element is a proxy network element of an AAA, namely, an AAA proxy is used as an example to describe authentication performed on a user plane by using authorization provisioning and authorization modification/cancellation of a PDU session. As shown in FIG. 8A and FIG. 8B, the method includes the following steps.

501. UE sends a PDU session establishment request and a secondary ID of the UE to an AMF.

Certainly, if a type of a PDU session is an Ethernet type, the UE sends both an Ethernet address of the UE and the request to the AMF.

502. The AMF sends the PDU session establishment request of the UE, an SUPI of the UE, a PEI of the UE, and the secondary ID of the UE to an SMF.

If the type of the PDU session is Ethernet, the Ethernet address of the UE is also sent to the SMF.

Optionally: 503. The SMF determines that the AAA needs to perform authentication on the UE or perform authorization on a PDU session of the UE.

In specific implementation, the SMF may determine, based on a locally prestored policy (for example, accessing the DN requires authentication and authorization by the AAA), whether the AAA needs to perform authentication on the UE or perform authorization on the PDU session of the UE. Alternatively, the SMF may use a related instruction carried in the PDU session establishment request sent by the UE, as a determining basis. Alternatively, the SMF may read subscription information of the UE from a UDM between step 502 and step 503, and determine, based on a reading-related policy in the subscription information, whether the AAA needs to perform authentication on the UE or perform authorization on the PDU session of the UE.

504. The SMF allocates a session address to the UE.

It should be noted that, if the type of the PDU session to be established for the UE is the Ethernet type, the SMF uses the Ethernet address of the UE received in step 503, as the session address to be used by the UE, namely, the foregoing session address, and may skip step 504 and directly perform step 505.

In addition, if the type of the PDU session to be established for the UE is not the Ethernet type, step 504 needs to be performed. Specifically, if the type of the PDU session is IPv4, the SMF allocates an IP address to the UE as the session address to be used by the UE. If the type of the PDU session is IPv6, the SMF allocates an IP prefix to the UE as the session address to be used by the UE. If the type of the PDU session is unstructured, the SMF allocates a tunnel IP address or a tunnel IP prefix to the UE as the session address to be used by the UE. The tunnel IP address or the tunnel IP prefix is allocated to a UPF.

505. The SMF sends an authorization request to the AAA proxy, and also sends the session address and the secondary ID to the AAA proxy.

Optionally, the SMF may further send any one or more of the SUPI of the UE, the PEI of the UE, and an external ID of the UE to the AAA proxy. The SMF may find the external ID of the UE in subscription data of the UE. In specific implementation, the SMF may send a to-be-sent message to the AAA proxy by using an AAR message in a diameter protocol.

506. The AAA proxy sends the authorization request to the AAA, and the request includes the secondary ID of the UE.

507. The AAA checks whether the UE has permission to access a DN. If the UE has the permission, an authorization success message is returned, and the procedure continues.

It should be noted that, step 506 and step 507 are optional steps.

508. The AAA proxy sends an AAA message in a diameter protocol to the SMF, where the AAA message includes an authorization result.

The authorization result is authorization information, indicating permission on the PDU session to be established for the UE. Optionally, the authorization information indicates that the PDU session is allowed to access only the AAA proxy. Further, a maximum transmission rate of the PDU session may be limited to a relatively small value.

In some embodiments, optionally, permission on the PDU session is allowing to access the AAA proxy and a DNS server and/or a DHCP server. The PDU session is allowed to access the DHCP server, so that the UE can obtain the IP address by using a DHCP. The PDU session is allowed to access the DNS server, so that the UE can search for an address of the AAA/the AAA proxy by using the DNS.

509. The SMF informs a PCF of information about the PDU session, where the information includes an address of the PDU session.

Optionally, the SMF may further send one or more IDs of the UE to the PCF.

510. The PCF sends a policy of the PDU session to the SMF.

Optionally, the policy of the PDU session indicates that the PDU session is allowed to access only the AAA, and further, may indicate a threshold of the maximum transmission rate of the PDU session, and the threshold is a relatively low transmission rate.

It should be noted that, at least one of step 508 and step 510 indicates that the PDU session is allowed to access only the AAA proxy.

511. The SMF informs a UPF of information about the PDU session, where the information includes the address of the PDU session and a processing rule of the PDU session.

It should be noted that, the processing rule of the PDU session is generated by the SMF based on the received policy of the PDU session, and the UPF ensures, by performing the processing rule of the PDU session, that the PDU session does not exceed an authorized range. Specifically, the processing rule may indicate that the PDU session is allowed to access only the AAA, and the maximum transmission rate of the PDU session should not exceed a threshold.

512. The UPF replies to the SMF with a response.

513. The SMF sends a PDU session establishment reply to the AMF.

514. The AMF forwards the PDU session establishment reply to the UE.

515. The UE obtains the address of the PDU session.

If the PDU sent by the UE is the Ethernet type, the address of the PDU session is the Ethernet address of the UE. If the type of the PDU is not the Ethernet type, but is, for example, an IP type or an unstructured type, the address of the PDU session is allocated by the SMF to the UE, and the SMF sends, to the UE by using another message, the address allocated to the UE, for example, sends the address by using a message of a DHCP protocol. In addition, a message may be alternatively sent between step 515 and step 516 to notify the address allocated to the UE.

516. The AAA performs authentication on the UE by using the established PDU session.

Specifically, an authentication message is transmitted between the UE and the AAA proxy by using a PDU. The AAA proxy forwards the authentication message to the AAA and the UE.

Further, if a type of the PDU is IP, any IP-protocol-based authentication protocol, for example, a SIP protocol, may be used. If a type of the PDU is Ethernet, any Ethernet-based authentication protocol, for example, a PPPoE protocol and an EAPoL protocol, may be used.

517. The AAA proxy determines, based on an authentication result, that the PDU session needs to be modified or released.

Specifically, if the authentication succeeds, the AAA determines that the PDU session needs to be modified, so that the PDU session can access a network element other than the AAA, and/or the UE can access a network element other than the AAA proxy at a higher transmission rate by using the PDU session. If the authentication succeeds, the AAA determines that the PDU session needs to be released.

In addition, a correspondence between the authentication result and the PDU session may be determined based on the address of the PDU session. Specifically, it may be determined, by identifying a source address or a source tunnel address of a PDU in uplink traffic, that the authentication corresponds to the foregoing PDU session. For example, a source address or a source tunnel address of the PDU carrying the authentication result is an address of the PDU session corresponding to the authentication result. Similarly, it may be determined, by using a destination address or a destination tunnel address of a PDU in downlink traffic, that the authentication corresponds to the foregoing PDU session. If the type of the PDU is IPv4, an uplink PDU source IP address and a downlink PDU destination IP address are consistent with the IP address (namely, the session address) obtained in step 505. If the type of the PDU is IPv6, an uplink PDU source IP address and a downlink PDU destination IP address match the IP prefix obtained in step 507. If the type of the PDU is Ethernet, an uplink PDU source Ethernet address and a downlink PDU destination Ethernet address are consistent with the Ethernet address obtained in step 505. If the type of the PDU is unstructured, an uplink PDU source tunnel address and a downlink PDU destination tunnel address match the tunnel IP address or the tunnel IP prefix obtained in step 505.

518. Based on the result of step 517, the AAA proxy sends a PDU session modification request or a PDU session release request.

518a. The request may be sent to the SMF. If the request is the PDU session modification request, an RAR message in the diameter protocol is used. If the request is the PDU session release request, an ASR message in the diameter protocol is used.

518b1. The request may be alternatively sent to the PCF. If the request is the PDU session modification request, an AAR message in the diameter protocol is used. If the request is the PDU session release request, an AAR message or an STR message in the diameter protocol is used. The request sent by the AAA includes the address of the PDU session, is used to identify the PDU session, and may further include one or more IDs of the UE for assisting in identifying the PDU session. In addition, if the AAA has sent these pieces of information to the PCF (for example, the AAA proxy has sent the PDU session modification request by using the PCF, and the request includes these pieces of information), these pieces of information do not need to be included.

518b2. The PCF further triggers the SMF to modify or release the PDU session.

519. The SMF modifies or releases the PDU session.

520. The AAA proxy receives a reply to modifying the PDU session or a reply to releasing the PDU session.

Corresponding to 518a, the reply may be sent by the SMF to the AAA proxy (step 520a). If the reply is the reply to modifying the PDU session, a reply message is an RAA message in the diameter protocol. If the reply is the reply to releasing the PDU session, a reply message is an ASA message in the diameter protocol.

Corresponding to 518b1, the PCF receives the reply from the SMF (step 520b1). Further, the PCF sends the reply to the AAA proxy (step 520b2). If the reply is the reply to modifying the PDU session, the reply message sent by the PCF is the AAA message (the message in the diameter protocol and an AAA network element in a standard have a same name) in the diameter protocol. If the reply is the reply to releasing the PDU session, the reply message is the AAA message or a STA message in the diameter protocol.

It should be noted that, a difference of this embodiment from the foregoing embodiment lies in that the proxy network element of the AAA, namely, the AAA proxy, is added, and most steps performed by the AAA in the foregoing embodiment are transferred to the AAA proxy. In addition, the AAA in this embodiment may be an S-CSCF network element in an IP multimedia subsystem (IP multimedia subsystem, IMS), and the AAA proxy may be a P-CSCF network element in the IMS.

Compared with the prior art, in this embodiment, the SMF obtains the Ethernet address of the UE, or allocates, to the UE, an IP address/a prefix used by the UE or a tunnel. The SMF adds these addresses to a diameter message of the authorization request and sends the diameter message to the AAA proxy, so that the AAA proxy can identify the PDU of the PDU session, and can be associated with the PDU session corresponding to the authentication result when performing authentication on the UE again after the PDU session is established. Further, when the authentication succeeds or fails, the AAA proxy learns of a PDU session whose modification or release should be triggered.

Figure 9A:
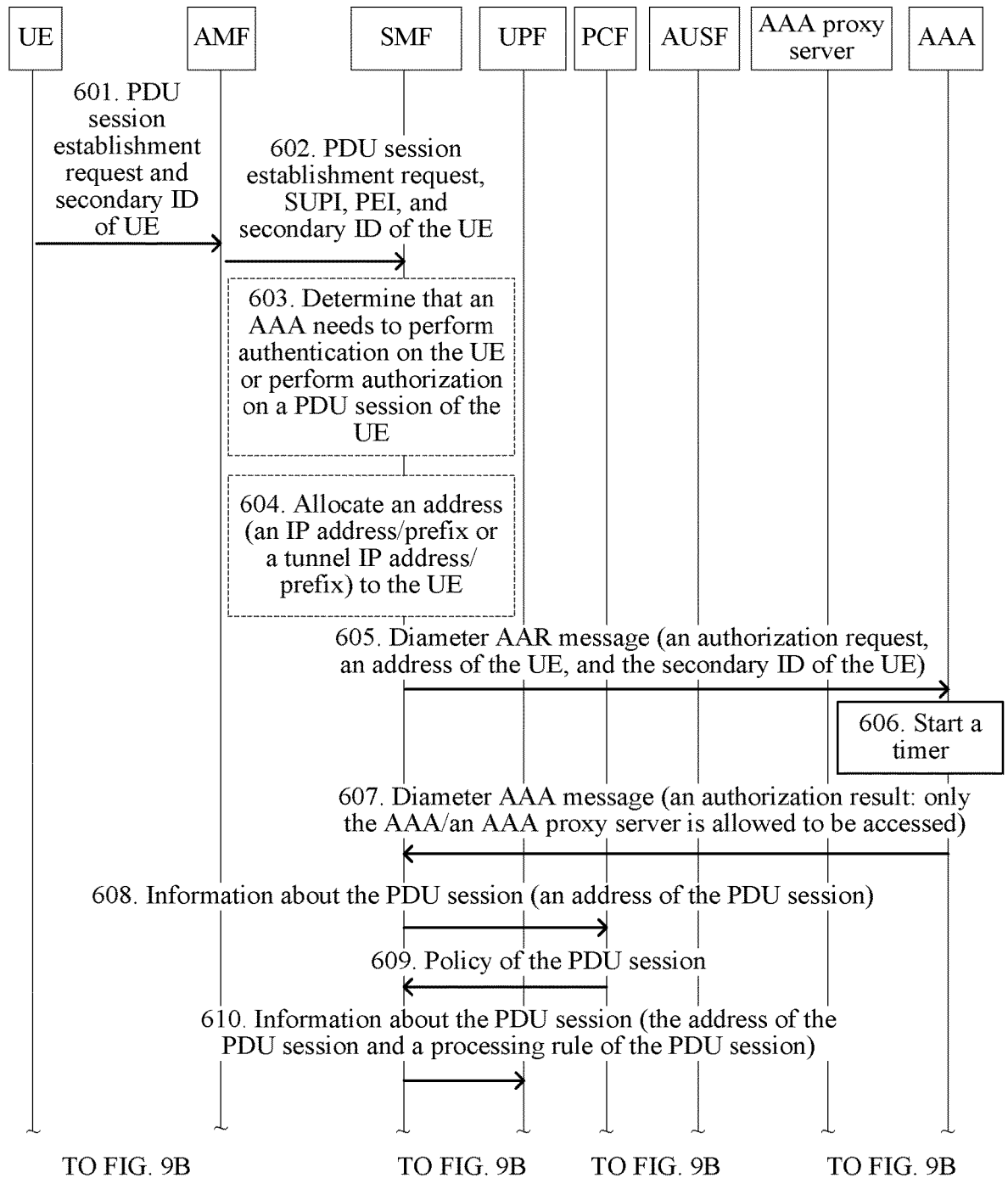
FIG. 9A and FIG. 9B are a schematic flowchart of another session processing method according to an embodiment of the present invention.
Figure 9B:
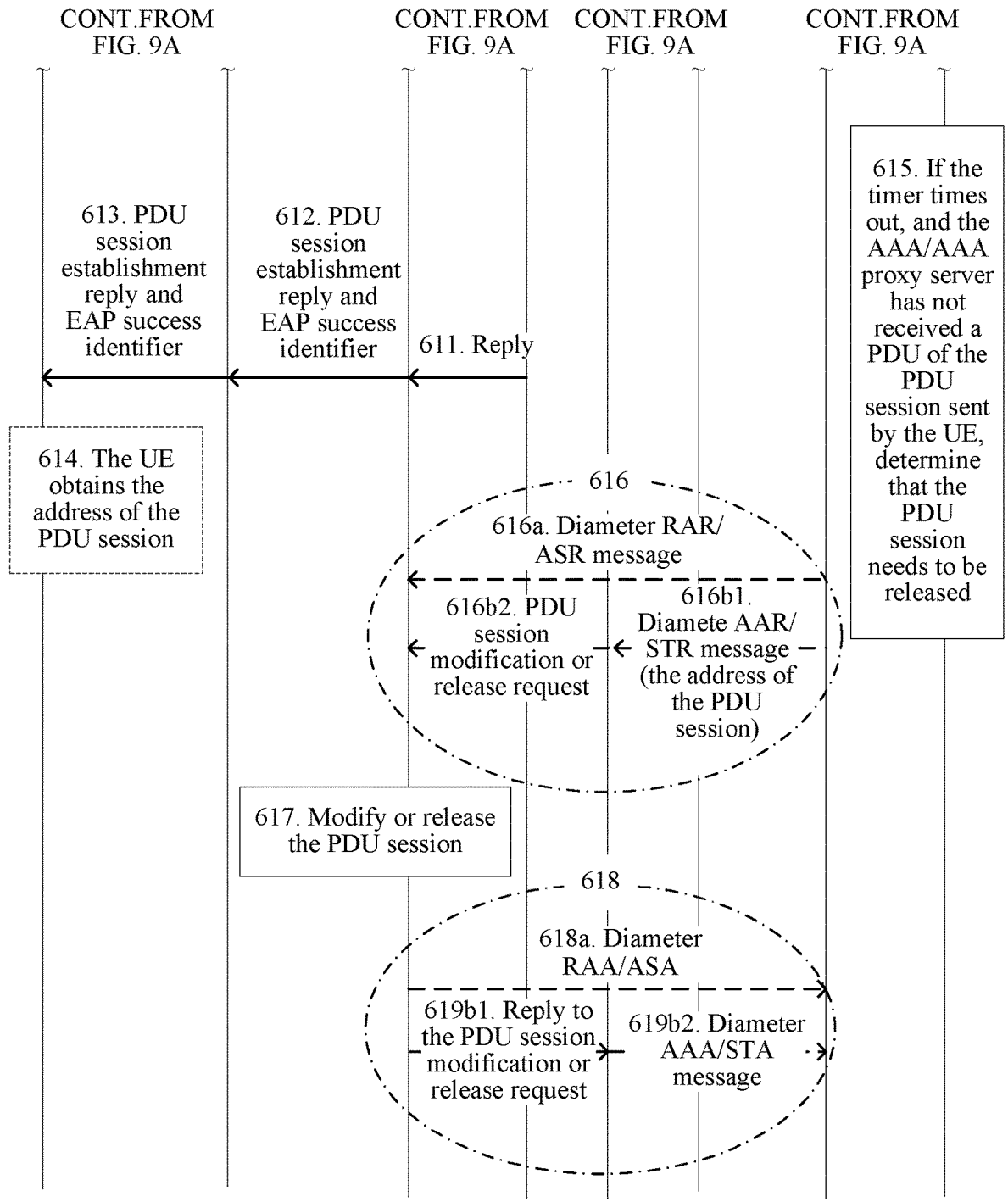

An embodiment of the present invention further provides a session processing method. That a data network element is a proxy network element of an AAA, namely, an AAA proxy is used as an example to describe authentication performed on a user plane by using authorization provisioning and authorization modification/cancellation of a PDU session. As shown in FIG. 9A and FIG. 9B, the method includes the following steps.

601. UE sends a PDU session establishment request and a secondary ID of the UE to an AMF.

Certainly, if a type of a PDU session is an Ethernet type, the UE sends both an Ethernet address of the UE and the request to the AMF.

602. The AMF sends the PDU session establishment request of the UE, an SUPI of the UE, a PEI of the UE, and the secondary ID of the UE to an SMF.

If the type of the PDU session is Ethernet, the Ethernet address of the UE is also sent to the SMF.

Optionally: 603. The SMF determines that the AAA needs to perform authentication on the UE and/or perform authorization on a PDU session of the UE.

The SMF determines that the AAA needs to perform authentication on the UE or perform authorization on the PDU session of the UE.

In specific implementation, the SMF may determine, based on a locally prestored policy (for example, accessing the DN requires authentication and authorization by the AAA), whether the AAA needs to perform authentication on the UE or perform authorization on the PDU session of the UE. Alternatively, the SMF may use a related instruction carried in the PDU session establishment request sent by the UE, as a determining basis. Alternatively, the SMF may read subscription information of the UE from a UDM between step 602 and step 603, and determine, based on a reading-related policy in the subscription information, whether the AAA needs to perform authentication on the UE or perform authorization on the PDU session of the UE.

604. The SMF allocates a session address to the UE.

It should be noted that, if the type of the PDU session to be established for the UE is the Ethernet type, the SMF uses the Ethernet address of the UE received in step 603, as the session address to be used by the UE, namely, the foregoing session address, and may skip step 604 and directly perform step 605.

In addition, if the type of the PDU session to be established for the UE is not the Ethernet type, step 604 needs to be performed. Specifically, if the type of the PDU session is IPv4, the SMF allocates an IP address to the UE as the session address to be used by the UE. If the type of the PDU session is IPv6, the SMF allocates an IP prefix to the UE as the session address to be used by the UE. If the type of the PDU session is unstructured, the SMF allocates a tunnel IP address or a tunnel IP prefix to the UE as the session address to be used by the UE. The tunnel IP address or the tunnel IP prefix is allocated to a UPF.

605. The SMF sends an authorization request to the AAA or the AAA proxy, and also sends the session address and the secondary ID to the AAA or the AAA proxy.

Optionally, the SMF may further send any one or more of the SUPI of the UE, the PEI of the UE, and an external ID of the UE to the AAA proxy or the AAA. The SMF may find the external ID of the UE in subscription data of the UE. In specific implementation, the SMF may send a to-be-sent message to the AAA proxy or the AAA by using an AAR message in a diameter protocol.

606. The AAA/AAA proxy starts a timer.

607. The AAA/AAA proxy sends an AAA message or a DEA message in a diameter protocol to the SMF, where the AAA message or the DEA message includes an authorization result.

The authorization result is authorization information, indicating permission on the PDU session to be established for the UE. Optionally, the authorization information indicates that the PDU session is allowed to access only the AAA or the AAA proxy. Further, a maximum transmission rate of the PDU session may be limited to a relatively small value.

In some embodiments, optionally, permission on the PDU session is allowing to access the AAA proxy and a DNS server and/or a DHCP server. The PDU session is allowed to access the DHCP server, so that the UE can obtain the IP address by using a DHCP. The PDU session is allowed to access the DNS server, so that the UE can search for an address of the AAA/the AAA proxy by using the DNS.

It should be noted that, step 606 and step 607 may be interchanged. In other words, the AAA/AAA proxy starts the timer after sending the AAA message or the DEA message in the diameter protocol to the SMF.

608. The SMF informs a PCF of information about the PDU session, where the information includes an address of the PDU session.

Optionally, the SMF may further send one or more IDs of the UE to the PCF.

609. The PCF sends a policy of the PDU session to the SMF.

Optionally, the policy of the PDU session indicates that the PDU session is allowed to access only the AAA, and further, may indicate a threshold of the maximum transmission rate of the PDU session, and the threshold is a relatively low transmission rate.

It should be noted that, at least one of step 607 and step 609 indicates that the PDU session is allowed to access only the AAA or the AAA proxy.

610. The SMF informs a UPF of information about the PDU session, where the information includes the address of the PDU session and a processing rule of the PDU session.

It should be noted that, the processing rule of the PDU session is generated by the SMF based on the received policy of the PDU session, and the UPF ensures, by performing the processing rule of the PDU session, that the PDU session does not exceed an authorized range. Specifically, the processing rule may indicate that the PDU session is allowed to access only the AAA or the AAA proxy, and the maximum transmission rate of the PDU session should not exceed a threshold.

611. The UPF replies to the SMF with a response.

612. The SMF sends a PDU session establishment reply to the AMF.

613. The AMF forwards the PDU session establishment reply to the UE.

614. The UE obtains the address of the PDU session.

If a PDU sent by the UE is the Ethernet type, the address of the PDU session is the Ethernet address of the UE. If the type of the PDU is not the Ethernet type, but is, for example, an IP type or an unstructured type, the address of the PDU session is allocated by the SMF to the UE, and the SMF sends, to the UE by using another message, the address allocated to the UE, for example, sends the address by using a message of a DHCP protocol. In addition, a message may be alternatively sent between step 614 and step 615 to notify the address allocated to the UE.

615. If the timer times out, and the AAA/AAA proxy has not received a PDU of the PDU session sent by the UE, determine that the PDU session needs to be released.

The AAA/AAA proxy can identify the PDU of the PDU session based on the address obtained in step 605. Identification of a source address or a source tunnel address of the PDU can determine whether the PDU corresponds to the foregoing PDU session. For example, if the type of the PDU is IPv4, a PDU source IP address is consistent with the IP address obtained in step 605. If the type of the PDU is IPv6, a PDU source IP address matches the IP prefix obtained in step 605. If the type of the PDU is Ethernet, a PDU source Ethernet address is consistent with the Ethernet address obtained in step 605. If the type of the PDU is unstructured, a PDU source tunnel address matches the tunnel IP address or the tunnel IP prefix obtained in step 605.

616. Based on the result of step 615, the AAA/AAA proxy sends a PDU session release request.

616*a*. The AAA/AAA proxy may send the request to the SMF. For the PDU session release request, an ASR message in the diameter protocol is used.

616*b*1. The AAA/AAA proxy sends the request to the PCF. For the PDU session release request, the AAR message or an STR message in the diameter protocol is used. The request sent by the AAA proxy/AAA includes the address of the PDU session, is used to identify the PDU session, and may further include one or more IDs of the UE for assisting in identifying the PDU session. In addition, if the AAA proxy/AAA has sent these pieces of information to the PCF (for example, the AAA proxy/AAA has sent the PDU session modification request by using the PCF, and the request includes these pieces of information), these pieces of information do not need to be included.

616*b*2. The PCF further triggers the SMF to release the PDU session.

617. The SMF releases the PDU session.

618. The AAA proxy/AAA receives a reply to releasing the PDU session.

Corresponding to 616*a*, the reply may be sent by the SMF to the AAA proxy (step 618*a*). The reply message to releasing the PDU session is an ASA message in the diameter protocol.

Corresponding to 616*b*1, the PCF receives the reply from the SMF (step 618*b*1). Further, the PCF sends the reply to the AAA proxy (step 618*b*2). The reply message to releasing the PDU session is an AAA message or a STA message in the diameter protocol.

Compared with the prior art, in this embodiment, the SMF may obtain the Ethernet address of the UE, or allocates, to the UE, an IP address/a prefix used by the UE or a tunnel. The SMF adds these addresses to a diameter message of the authorization request and sends the diameter message to the AAA/AAA proxy, so that the AAA/AAA proxy can identify the PDU of the PDU session, and when the PDU that is of the PDU session and that is used for authentication is not received when time is out, the AAA/AAA proxy determines that the PDU session needs to be released. Further, the AA/AAA proxy triggers releasing of the PDU session by using the PCF.

The foregoing mainly describes the solutions provided in the embodiments of this application from the perspective of interaction between network elements. It may be understood that, to implement the foregoing functions, the network elements such as the SMF and the data-network network element include corresponding hardware structures and/or software modules for implementing the functions. A person of ordinary skill in the art should be easily aware that, algorithm steps in the examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed for the SMF and the data-network network element based on the foregoing method examples. For example, the function module division may be performed in correspondence with the functions, or two or more functions may be integrated into one processing module. The integrated module may be implemented in a form of hardware, or may be implemented in a form of a software function module. It should be noted that the module division in the embodiments of this application is an example, and is merely a logical function division. In actual implementation, another division manner may be used.

Figure 10:
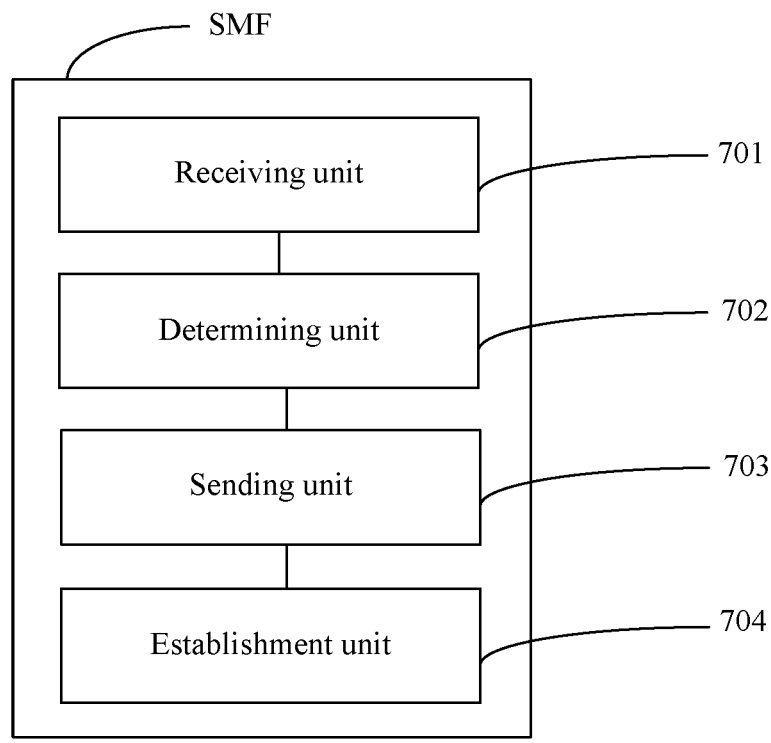
FIG. 10 is another schematic composition diagram of a session function management network element according to an embodiment of the present invention.

When function modules are obtained through division based on corresponding functions, FIG. 10 is a possible schematic composition diagram of a session management function network element SMF in the foregoing embodiment. As shown in FIG. 10, the SMF may include a receiving unit 701, a determining unit 702, a sending unit 703, and an establishment unit 704.

The receiving unit 701 is configured to support the SMF in performing step 101 in the session processing method shown in FIG. 4.

The determining unit 702 is configured to support the SMF in performing step 102 in the session processing method shown in FIG. 4.

The determining unit 703 is configured to support the SMF in performing step 103 in the session processing method shown in FIG. 4.

The establishment unit 704 is configured to support the SMF in performing step 104 in the session processing method shown in FIG. 4.

It should be noted that, all content related to the steps in the foregoing method embodiments may be cited in functional descriptions of corresponding function modules. Details are not described herein again.

The SMF provided in this embodiment of this application is configured to perform the foregoing discovery signal transmission method, and therefore, can achieve a same effect as the foregoing discovery signal transmission method.

Figure 11:
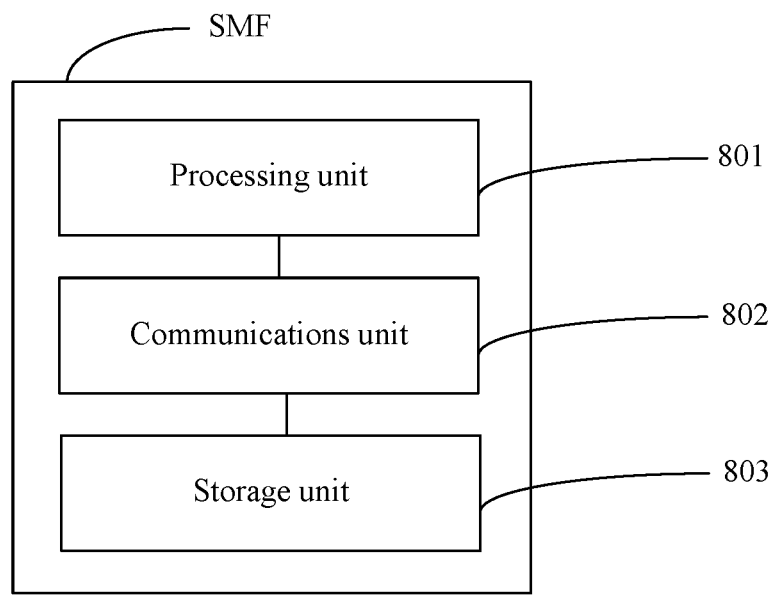
FIG. 11 is another schematic composition diagram of a session function management network element according to an embodiment of the present invention.

When an integrated unit is used, FIG. 11 is another possible schematic composition diagram of an SMF used in the foregoing embodiments. As shown in FIG. 11, the SMF includes a processing module 801 and a communications module 802.

The processing module 801 is configured to control and manage an action of a server. For example, the processing module 801 is configured to support the SMF in performing step 102 and step 105 in FIG. 4 and/or perform another process of the technology described in this specification. The communications module 802 is configured to support communication between the SMF and another network entity, for example, communication between the SMF and the UPF shown in FIG. 1. The SMF may further include a storage module 803, configured to store program code and data of the server.

The processing module 801 may be a processor or a controller. The processing module 801 may implement or execute various example logical blocks, modules, and circuits described with reference to content disclosed in this application. Alternatively, the processor may be a combination for implementing a computing function, for example, a combination including one or more microprocessors, or a combination of a DSP and a microprocessor. The communications module 802 may be a transceiver, a transceiver circuit, a communications interface, or the like. The storage module 803 may be a memory.

When the processing module 801 is a processor, the communications module 802 is a communications interface, and the storage module 803 is a memory, the SMF used in this embodiment of this application may be the session management function network element shown in FIG. 2.

Figure 12:
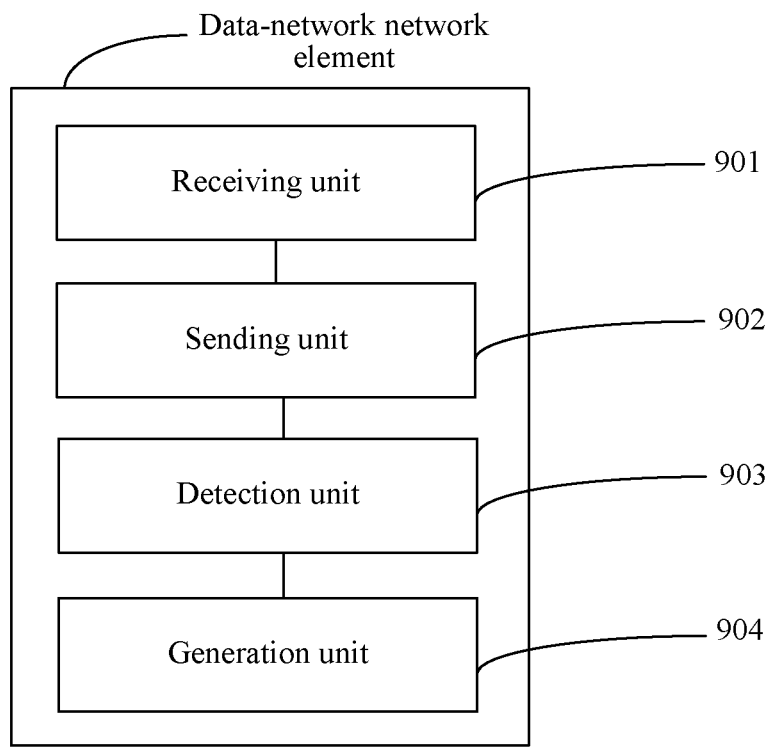
FIG. 12 is another schematic composition diagram of a data-network network element according to an embodiment of the present invention.

When function modules are obtained through division based on corresponding functions, FIG. 12 is a possible schematic composition diagram of a data-network network element used in the foregoing embodiments. As shown in FIG. 12, the data-network network element may include a receiving unit 901, a sending unit 902, a detection unit 903, and a generation unit 904. The data-network network element may be a network element in the DN shown in FIG. 1.

The receiving unit 901 is configured to support the data-network network element in performing step 103 in the session processing method shown in FIG. 4.

The sending unit 902 is configured to support the data-network network element in performing step 104 in the session processing method shown in FIG. 4, and the step of "instructing, by using the session processing request generated by the generation unit, the SMF to process the session of the UE" in step 107.

The detection unit 903 is configured to support the data-network network element in performing step 106 in the session processing method shown in FIG. 4.

The generation unit 904 is configured to support the data-network network element in performing the step of "generating a session processing request" in step 107 in the session processing method shown in FIG. 4.

It should be noted that, all content related to the steps in the foregoing method embodiments may be cited in functional descriptions of corresponding function modules. Details are not described herein again.

The data-network network element provided in this embodiment of this application is configured to perform the foregoing discovery signal transmission method, and therefore, can achieve a same effect as the foregoing discovery signal transmission method.

Figure 13:
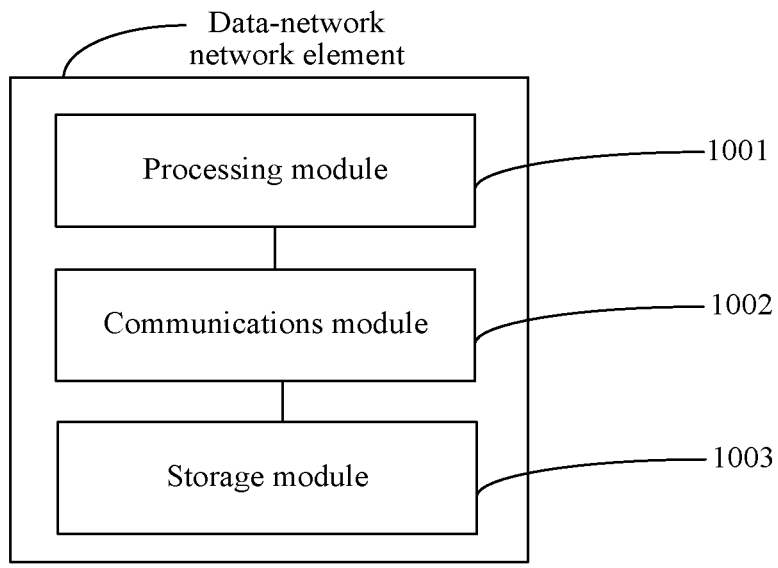
FIG. 13 is another schematic composition diagram of a data-network network element according to an embodiment of the present invention.

When an integrated unit is used, FIG. 13 is another possible schematic composition diagram of a data-network network element used in the foregoing embodiments. As shown in FIG. 13, the data-network network element includes a processing module 1001 and a communications module 1002.

The processing module 1001 is configured to control and manage an action of the data-network network element. For example, the processing module 1001 is configured to support the SMF in performing step 106 and step 107 in FIG. 4 and/or perform another process of the technology described in this specification. The communications module 1002 is configured to support communication between the data-network network element and another network entity, for example, communication between the data-network network element and the UPF shown in FIG. 1. As shown in FIG. 13, the data-network network element may further include a storage module 1003, configured to store program code and data of the data-network network element.

The processing module 1001 may be a processor or a controller. The processing module 1001 may implement or execute various example logical blocks, modules, and circuits described with reference to content disclosed in this application. Alternatively, the processor may be a combination for implementing a computing function, for example, a combination including one or more microprocessors, or a combination of a DSP and a microprocessor. The communications module 1002 may be a transceiver, a transceiver circuit, a communications interface, or the like. The storage module 1003 may be a memory.

When the processing module 1001 is a processor, the communications module 1002 is a communications interface, and the storage module 1003 is a memory, the data-network network element used in this embodiment of this application may be the data-network network element shown in FIG. 3.

From the foregoing descriptions about the implementations, a person skilled in the art can understand that, for the purpose of ease and brevity of description, division of the foregoing function modules is used as an example for illustration. In actual application, the foregoing functions may be allocated to and implemented by different function modules depending on a requirement. In other words, an inner structure of an apparatus is divided into different function modules to implement all or some of the functions described above. For detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A session processing method comprising:
   receiving, by a session management function network element, a session establishment request from user equipment (UE) for establishing a session,
      wherein the session management function network element is a control plane network element in an operator network, and is responsible for establishing and managing the session of the UE;
   determining, by the session management function network element, a session address of the session;
   sending, by the session management function network element, a data network access request to a data-network network element in a data network for authenticating and authorizing the session, wherein the data network access request comprises the session address and an identifier of the UE;
   receiving, by the session management function network element, a response message from the data-network network element, wherein the response message instructs the session management function network element to allow the UE to access the data network;
   establishing, by the session management function network element, the session of the UE;
   receiving, by the session management function network element, a session processing request triggered by the data-network network element; and
   processing, by the session management function network element, the session according to the session processing request, including modifying or deleting the session.

2. The method according to claim 1, wherein determining the session address of the session comprises allocating, by the session management function network element, an IP address to the UE as the session address.

3. The method according to claim 1, wherein receiving the session processing request triggered by the data-network network element comprises:
   receiving, by the session management function network element, a first session processing request from the data-network network element; or
   receiving, by the session management function network element, a third session processing request from a policy control function network element,
      wherein the third session processing request is sent to the session management function network element after the policy control function network element receives a second session processing request from the data-network network element, and
      wherein the policy control function network element is a control plane network element configured to provide a session policy for the session management function network element.

4. A session processing method comprising:
   receiving, by a data-network network element in a data network, a data network access request from a session management function network element for establishing and managing the a session of a UE, wherein the data network access request comprises an identifier of user equipment (UE) and a session address of the session, and
wherein the session management function network element is a control plane network element in an operator network;
performing, by the data-network network element, authentication on the UE;
sending, by the data-network network element, a response message to the session management function network element, wherein the response message indicates an allowance for the UE to access the data network;
determining, by the data-network network element based on the session address or the identifier of the UE, that the session needs to be processed; and
sending, by the data-network network element, the session processing request to the session management function network element, wherein the session processing request comprises the session address and/or the identifier of the UE.

5. The method according to claim 4, wherein the response message comprises an authentication success identifier.

6. The method according to claim 4, wherein determining that the session needs to be processed comprises
determining that a session corresponding to the identifier of the UE needs to be processed in response to detecting that the UE is in an abnormal access state comprising at least one of the following cases: the UE is an unauthorized UE, a subscription status of the UE changes, and a trust level of the UE changes.

7. A session management function network element in an operator network and responsible for establishing and managing a session of a user equipment (UE), the session management function network element comprising:
a processor in communication with a storage medium that includes one or more executable instructions for execution by the processor;
a receiver configured to cooperate with the processor to receive a session establishment request from the UE;
wherein the processor, when executing the one or more executable instructions, is configured to determine a session address to be used by a session of the UE;
a transmitter configured to cooperate with the processor to send a data network access request to a data-network network element in a data network, wherein the data network access request comprises the session address and an identifier of the UE;
the receiver is further configured to cooperate with the processor to receive a response message from the data-network network element, wherein the response message indicates an allowance for the UE to access the data network; and
wherein the processor, when executing the one or more executable instructions, is further configured to
establish the session of the UE,
receive a session processing request triggered by the data-network network element after establishing the session, wherein the session processing request comprises the session address and/or the identifier of the UE, and
process the session according to the session processing request, including modifying or deleting the session.

8. The session management function network element according to claim 7, wherein the processor is further configured to allocate an IP address to the UE as the session address.

9. The session management function network element according to claim 7, wherein the receiver is further configured to cooperate with the processor to receive a first session processing request sent by the data-network network element.

10. A data-network network element in a data network and responsible for authenticating and authorizing a session of a user equipment (UE), the data-network network comprising:
a processor in communication with a storage medium that includes one or more executable instructions for execution by the processor;
a receiver configured to cooperate with the processor to receive a data network access request sent by a session management function network element in an operator network and responsible for establishing and managing the session, wherein the data network access request comprises an identifier of the UE and a session address to be used by the UE;
a transmitter configured to cooperate with the processor to send a response message to the session management function network element, wherein the response message instructs the session management function network element to allow the UE to access the data network, so that the session management function network element establishes the session of the UE;
wherein the processor, when executing the one or more executable instructions, is configured to:
detect, based on the session address or the identifier of the UE, that the session of the UE needs to be processed, and
generate a session processing request when detecting that the session of the UE needs to be processed; and
the transmitter further configured to cooperate with the processor to instruct, by using the session processing request, the session management function network element to modify or delete the session of the UE.

11. The data-network network element according to claim 10, wherein the response message comprises an authentication success identifier.

12. The data-network network element according to claim 10, wherein the processor is further configured to determine that a session associated with the identifier of the UE needs to be processed in response to detecting that the UE is in an abnormal access state,
wherein the abnormal access state comprises at least one of the following cases: the UE is an unauthorized UE, a subscription status of the UE changes, and a trust level of the UE changes.

13. The method according to claim 1, wherein the session address is a Ethernet address received from the UE.

14. The method according to claim 1, wherein the method further comprising:
receiving, by the data-network network element, the data network access request from the session management function network element;
performing, by the data-network network element, authentication on the UE;
sending, by the data-network network element, the response message to the session management function network element;
determining, by the data-network network element based on the session address or the identifier of the UE, that the session needs to be processed; and
sending, by the data-network network element, the session processing request to the session management function network element, wherein the session processing request comprises the session address and/or the identifier of the UE.

15. The method according to claim 14, wherein the response message comprises an authentication success identifier.

16. The method according to claim 14, wherein determining that the session needs to be processed comprises:
determining, by the data-network network element, that the session needs to be processed in response to detecting that the UE is in an abnormal access state comprising at least one of the following cases: the UE is an unauthorized UE, a subscription status of the UE changes, and a trust level of the UE changes.

17. A communication system comprising a session management function network element in an operator network and a data-network network element in a data network,
wherein the session management function network element is configured to:
receive a session establishment request from user equipment (UE) for establishing a session;
determine a session address of the session;
send a data network access request to the data-network network element for authenticating and authorizing the session, wherein the data network access request comprises the session address and an identifier of the UE;
receive a response message from the data-network network element, wherein the response message instructs the session management function network element to allow the UE to access the data network; establish the session of the UE;
receive a session processing request triggered by the data-network network element; and
process the session according to the session processing request, including modifying or deleting the session;
the data-network network element is configured to:
receive the data network access request from the session management function network element;
perform authentication on the UE;
send the response message to the session management function network element;
determine, based on the session address or the identifier of the UE, that the session needs to be processed; and
send the session processing request to the session management function network element; wherein the session processing request comprises the session address and/or the identifier of the UE.

18. The system according to claim 17, wherein the data-network network element is further configured to:
determine that the session needs to be processed in response to detecting that the UE is in an abnormal access state comprising at least one of the following cases: the UE is an unauthorized UE, a subscription status of the UE changes, and a trust level of the UE changes.

19. The system according to claim 17, wherein the session management function network element is configured to allocate an IP address to the UE as the session address.

20. The system according to claim 17, wherein the session address is a Ethernet address received from the UE.

* * * * *